(12) United States Patent
Sakata et al.

(10) Patent No.: US 7,546,551 B2
(45) Date of Patent: Jun. 9, 2009

(54) INFORMATION PROCESSING APPARATUS, METHOD, AND PROGRAM

(75) Inventors: Junichiro Sakata, Tokyo (JP); Kumiko Sasaki, Kanagawa (JP); Masahiro Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 11/067,553

(22) Filed: Feb. 25, 2005

(65) Prior Publication Data
US 2005/0283804 A1 Dec. 22, 2005

(30) Foreign Application Priority Data
Feb. 27, 2004 (JP) ............... 2004-054857

(51) Int. Cl.
*G06F 3/048* (2006.01)
(52) U.S. Cl. .................. 715/841; 715/829; 715/845
(58) Field of Classification Search ......... 715/817–820, 715/825–829, 841, 845
See application file for complete search history.

(56) References Cited
U.S. PATENT DOCUMENTS
5,689,668 A * 11/1997 Beaudet et al. ............. 715/841
6,154,750 A * 11/2000 Roberge et al. ............. 715/854
2004/0250217 A1* 12/2004 Tojo et al. .................. 715/810

FOREIGN PATENT DOCUMENTS

| JP | 2001-75961 | 3/2001 |
|---|---|---|
| JP | 2001-188697 | 7/2001 |
| JP | 2001-243746 | 9/2001 |
| JP | 2001-306372 | 11/2001 |
| JP | 2001-356778 | 12/2001 |
| JP | 2002-108359 | 4/2002 |
| JP | 2003-162285 | 6/2003 |

* cited by examiner

*Primary Examiner*—Weilun Lo
*Assistant Examiner*—Truc T Chuong
(74) *Attorney, Agent, or Firm*—Oblon, Spivak, McClelland, Maier & Neustadt, P.C.

(57) ABSTRACT

A method of achieving an operation by sequentially selecting menu items arranged in a plurality of menu levels is provided. The method includes the steps of: generating a menu in which one or more menu items are arranged along a predetermined direction on a display screen; and controlling display of the generated menu. In the present method, a display form of one of the menu levels, which was previously available for selection, changes in response to an operation for shifting the menu level.

7 Claims, 22 Drawing Sheets

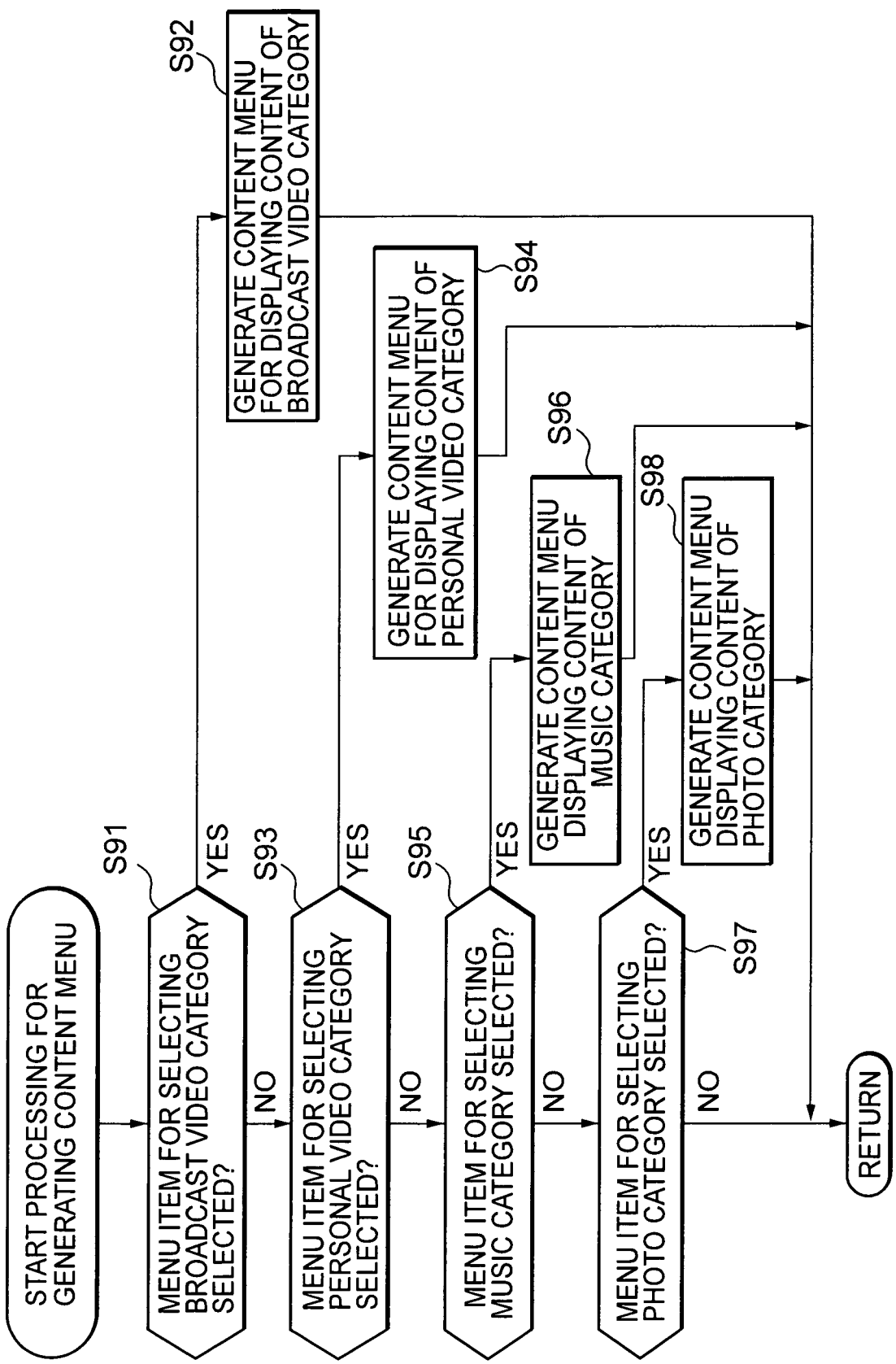

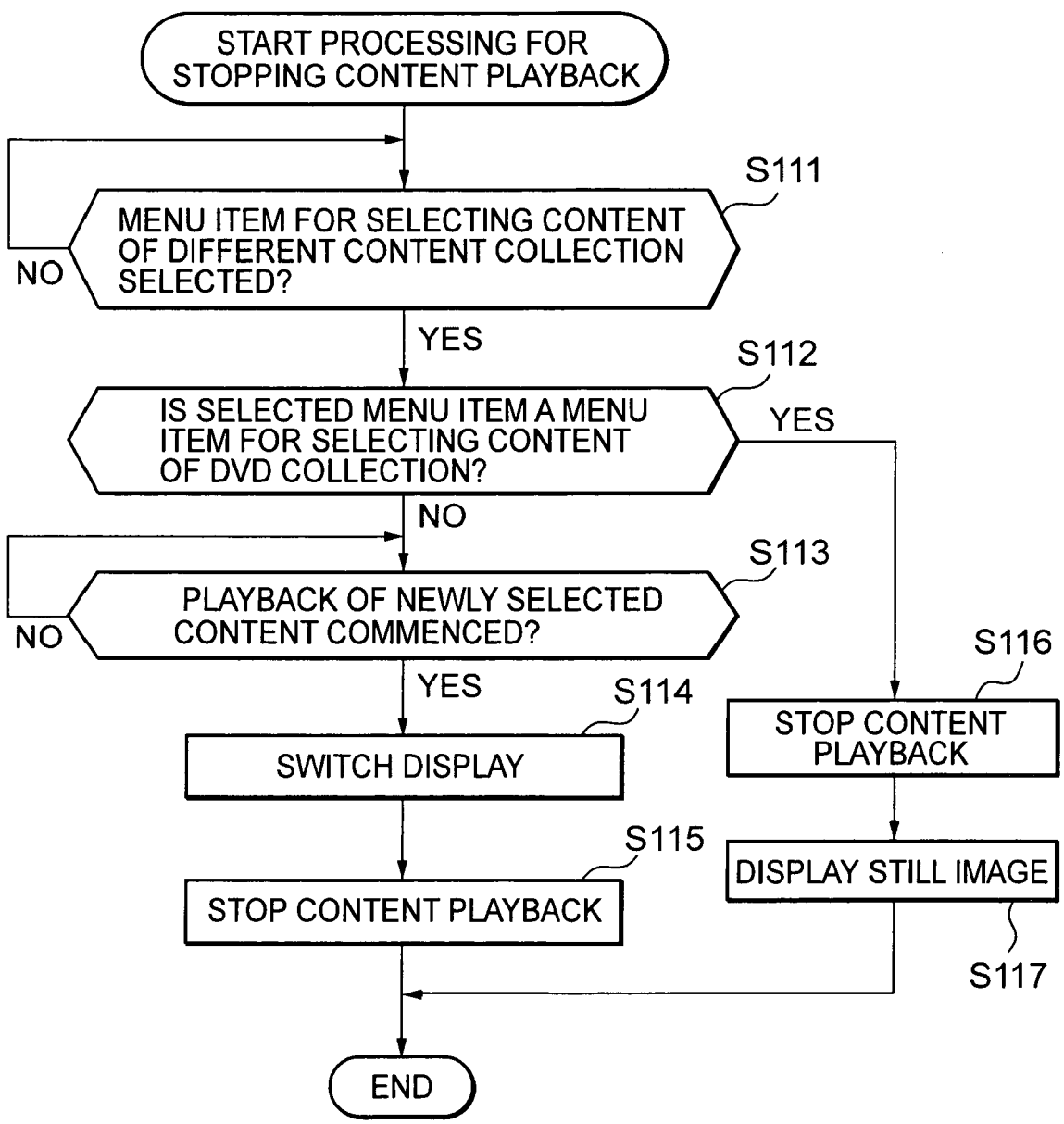

INFORMATION PROCESSING APPARATUS, METHOD, AND PROGRAM

BACKGROUND OF THE INVENTION

1. Field of the Invention

The present invention relates to an information processing apparatus, method, and program, and particularly relates to an information processing apparatus, method, and program capable of selecting content using menus.

2. Description of Related Art

In recent years, for television broadcasts etc., services providing EPG (Electronic Program Guide) to users, who will be viewers, have become widespread. The EPG is program guide information constituted by electronic information to show a program broadcast schedule corresponding to so-called newspaper radio/television columns.

Keywords such as a program title, broadcast time, program genre and cast etc. are contained in the EPG and a user can record a program (content) using this EPG.

When EPG is used with recording/playback apparatuses, if a program is recorded, EPG information is recorded. The recorded EPG information is classified into categories based on pre-defined program classification standards, and classification numbers corresponding to categories are allotted for facilitating the recording of programs. (See, for example, International Patent Application Publication Number WO 00/02386).

With this recording/playback apparatus, if a user specifies or selects a classification number, a recorded program corresponding to the specified category number is played back.

Further, if a personal computer (PC) is used as a recording/playback apparatus, a recorded program (content) can be played back by an application program for use in playing back content recorded on a PC.

In this event, a user starts up an multimedia playback application program for playing back various content. An application program for playing back content of each individual format is selected at the multimedia playback application program, and content is played back as a result of a user designating content.

FIG. 1 to FIG. 3 are views illustrating an multimedia playback application program.

In FIG. 1 to FIG. 3, "music", "photo", "video", and "television broadcast" are categories for classifying content that can be selected by a user in application programs for multimedia playback use. Atrac (Adaptive Transform Acoustic Coding) 3 format content and MP (MPEG Audio Layer) 3 format content are stored as content classified as "music". Further, JPEG (Joint Photographic Experts Group) format content and BMP (BitMap) format content are stored as content classified as "photo", and MPEG (Moving Picture Experts Group) 2 format content is stored as content classified as "video".

Further, if a user specifies a prescribed channel, a program being broadcast at the designated channel is displayed at a display as content classified as "television broadcast".

As shown in FIG. 1, the respective categories and content are separate at the application programs for multimedia playback use.

Therefore, with the application programs for multimedia use, as shown in FIG. 2, a menu structure for selecting respective categories is hierarchical. A user therefore selects a category of one of "music", "photo", "video" and "television broadcast" from a media selection menu and selects an application program for playing back content from the selected category menu. The user selects a folder storing content to be played back, and the content is played back as a result of selecting (designating) the content from the selected folder.

Further, if a user selects "television broadcast" as a category from the media selection menu, a program for playing back content classified as "television broadcast" is selected. A program being broadcast at a designated channel is displayed at the display as a result of designating this desired channel.

As described above, a user is allowed to find a certain content by classifying content in advance as menu items in accordance with a predetermined standard so that the menu item serves as an user interface for searching and selecting a desired content from a numerous number of content, and allowing the user to make sequential selection with a menu of multi-level structure (For example, see Japanese Patent Application Publication Number JP 2003-29931).

However, in the technology disclosed in JP 2003-29931, there is an disadvantage such that, even if a menu level that allows menu item selection is changed to a lower level, a display form of the menu level that has once displayed does not change, thereby making it difficult for a user to intuitively understand in which menu level the user is making the menu item selection or how the different menu levels are interrelated to each other.

Accordingly, it is desirable to change a form of display in each of menu levels depending on an operational phase of the menu item selection. The present invention is made in view of the above-described situation.

SUMMARY OF THE INVENTION

According to an embodiment of the present invention there is provided an information processing apparatus. The information processing apparatus includes: menu generation means for generating a menu in which one or more menu items are arranged along a predetermined direction on a display screen; and display control means for controlling display of the menu generated by the menu generation means. Furthermore, in the information processing apparatus, the display control means changes a display form of one of the menu levels, which has been available for selection, in response to an operation for shifting the menu level.

According to another embodiment of the present invention, there is provided an information processing apparatus. The information processing apparatus includes: menu generation means for generating a menu in which one or more menu items are arranged along a first direction on a display screen; display control means for controlling display of the menu generated by the menu generation means; and menu level shifting means for shifting the menu level available for selection along a second direction in response to a signal from a first operator that corresponds to a movement in the second direction, the second direction crossing the first direction. Furthermore, with the information processing apparatus, in response to the shifting of the menu level, the display control means reduces a size of a region for displaying one of the menu levels, which was previously available for selection before the shifting of the menu level, in the second direction, and the display control means displays another menu level, which is currently available for selection after the shifting of the menu level, by utilizing a part or all of the display region in which the one of the menu levels was displayed, the one of the menu levels being previously available for selection before the shifting of the menu level.

In response to the shifting of the menu level, the display control means may further perform deleting of one or more of menu items other than a menu item currently selected among the menu items belonging to the menu level that was previously available for selection before the shifting of the menu level.

The first operator may correspond to a movement in both directions parallel to the second direction; and in response to the shifting of the menu level, the display control means may display a new menu in a menu level adjacent to the menu level that is currently available for selection after the shifting, the new menu being displayed at one side of the menu level available for selection after the shifting, the side being in a direction the first operator indicates to move.

The display control means may switch display of menu items belonging to a menu level adjacent to the menu level that is currently available for selection in response to a signal from a second operator that corresponds to a movement in the first direction.

The first operator may enable a movement in the second direction from a menu item positioned in a predetermined location on the display screen, the menu item being one of menu items reachable by the movement in the first direction indicated by the second operator; and the display control means may display the menu item positioned in the predetermined location and the menu item belonging to the menu level adjacent to the menu level that is currently available for selection in substantially the same position in the first direction.

According to another embodiment of the present invention, there are provided a method of achieving an operation by sequentially selecting menu items arranged in a plurality of menu levels, a program executable by a computer to perform such a method, and a recording medium or media storing such a program. The method includes the steps of: generating a menu in which one or more menu items are arranged along a predetermined direction on a display screen; and controlling display of the generated menu. Further, in the method, a display form of one of the menu levels, which was previously available for selection, changes in response to an operation for shifting the menu level.

According to another embodiment of the present invention, there are provided a method of achieving an operation by sequentially selecting menu items arranged in a plurality of menu levels, a program executable by a computer to perform such a method, and a recording medium or media storing such a program. The method includes the steps of: generating a menu in which one or more menu items are arranged along a first direction on a display screen; controlling display of the generated menu; and shifting the menu level available for selection along a second direction in response to a signal indicating a movement in the second direction, the second direction crossing the first direction. In the present method, in response to the shifting of the menu level, a size of a region for displaying one of the menu levels, which was previously available for selection before the shifting of the menu level, is reduced in the second direction, and another menu level, which is currently available for selection after the shifting of the menu level, is displayed by utilizing a part or all of the display region in which the one of the menu levels was displayed, the one of the menu level being previously available for selection before the shifting of the menu level.

The present invention may make it possible to display current selectable menu items with a display form that is more easily recognizable by a user, and allow a user to easily understand inter-relation among different menu levels.

BRIEF DESCRIPTION OF THE DRAWINGS

The above and other objects, features and advantages of the present invention will become more apparent from the following description of the presently exemplary embodiment (s) of the invention taken in conjunction with the accompanying drawings, in which:

FIG. 21 is a flowchart illustrating content menu generation processing; and

FIG. 22 is a flowchart illustrating processing for stopping playback of content.

DETAILED DESCRIPTION OF THE EMBODIMENTS

According to an embodiment of the present invention, there is provided an information processing apparatus. The information processing apparatus may include: menu generation means (for example, menu item generator 95 of FIG. 6) for generating a menu in which one or more menu items are arranged along a predetermined direction (for example, vertical axis direction in a window 111 of FIG. 7) on a display screen; and display control means (for example, display controller 72 of FIG. 6) for controlling display of the menu generated by the menu generation means. The display control means may change a display form (for example, media selection menu of FIG. 8) of one of the menu levels which was previously available for selection in response to an operation for shifting the menu level (for example, instruction for moving in horizontal axis direction by input unit 27 of FIG. 5).

According to an embodiment of the present invention, there is provided an information processing apparatus. The information processing apparatus may include: menu generation means (for example, menu item generator 95 of FIG. 6) for generating a menu in which one or more menu items are arranged along a first direction (for example, vertical axis direction in a window 111 of FIG. 7) on a display screen; display control means (for example, display controller 72 of FIG. 6) for controlling display of the menu generated by the menu generation means; and menu level shifting means (for example, display controller 72 of FIG. 6) for shifting the menu level available for selection along a second direction (for example, horizontal direction in window 111 of FIG. 7) in response to a signal from a first operator (for example, left/right arrow key of input unit 27 of FIG. 5) that corresponds to a movement in the second direction, the second direction crossing the first direction. The display control means, in response to the shifting of the menu level, may reduce a size of a region for displaying one of the menu levels (for example, media selection menu shown in FIG. 8), which was previously available for selection before the shifting of the menu level, in the second direction, and the display control means may display another menu level (for example, sommelier menu shown in FIG. 8), which is currently available for selection after the shifting of the menu level, by utilizing a part or all of the display region in which the one of the menu levels was displayed, the one of the menu levels being previously available for selection before the shifting of the menu level.

Figure 8:
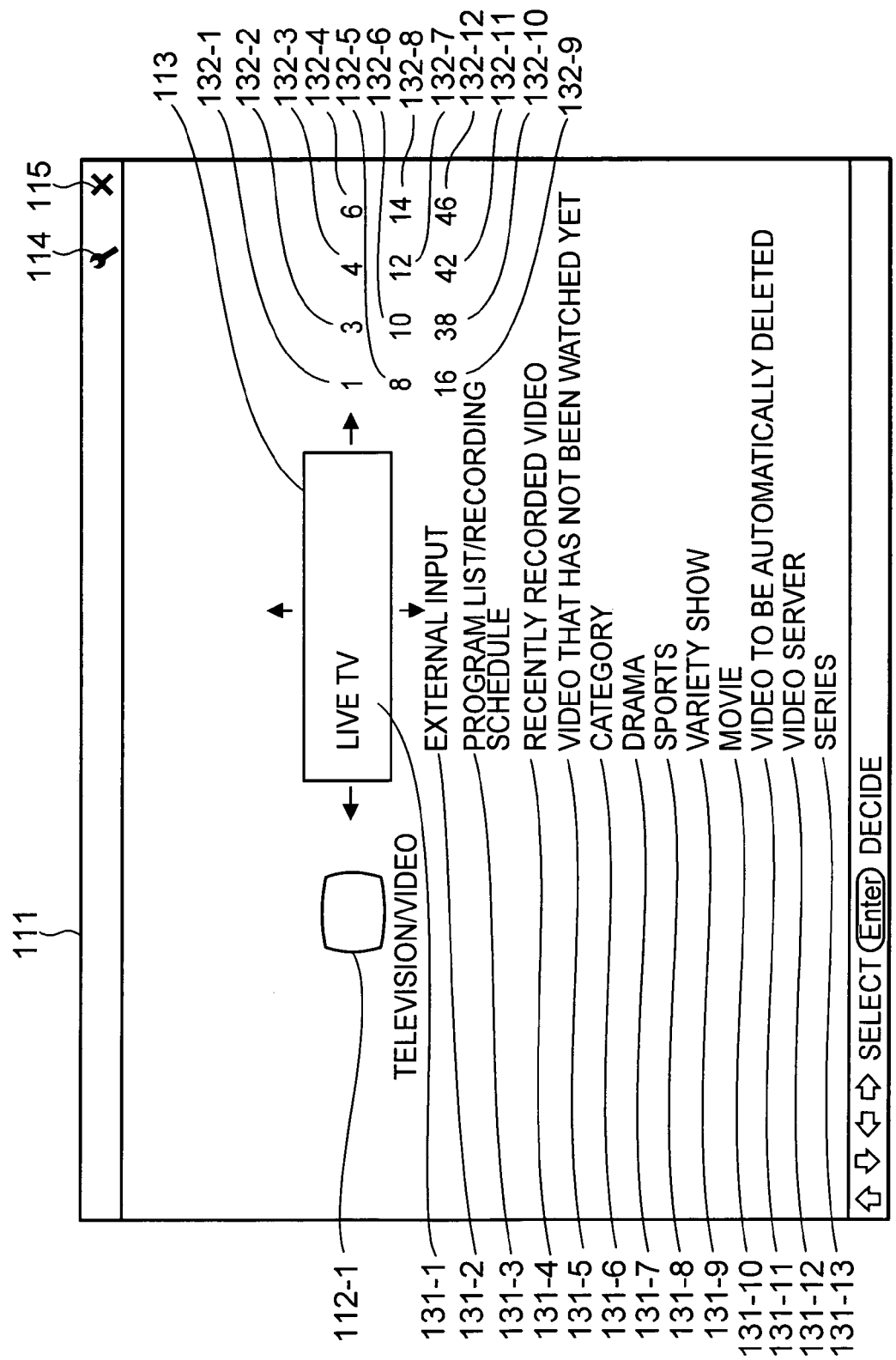
FIG. 8 is a view showing an example of a sommelier menu.

Furthermore, in the information processing apparatus, the display control means may further perform deleting of one or more of menu items other than a menu item currently selected (for example, "Television/video" button is currently selected in FIG. 8) among the menu items belonging to the menu level that was previously available for selection before the shifting of the menu level in response to the shifting of the menu level.

The first operator of the information processing apparatus may correspond to a movement in both directions parallel to the second direction. Furthermore, in response to the shifting of the menu level, the display control means of the information processing apparatus may display a new menu (for example, content menu shown in FIG. 10) in a menu level adjacent to the menu level that is currently available for selection after the shifting, the new menu being displayed at one side of the menu level available for selection after the shifting, the side being in a direction the first operator indicates to move.

In the information processing apparatus, the display control means may switch display of menu items belonging to a menu level adjacent to the menu level that is currently available for selection in response to a signal from a second operator (for example, up/down arrow key of input unit 27 of FIG. 5) that corresponds to a movement in the first direction.

The first operator of the information processing apparatus may enable a movement in the second direction from a menu item positioned in a predetermined location on the display screen, the menu item being one of menu items reachable by the movement in the first direction indicated by the second operator. The display control means of the information processing apparatus may display the menu item positioned in the predetermined location and the menu item belonging to the menu level adjacent to the menu level that is currently available for selection in substantially the same position in the first direction.

According to another embodiment of the present invention, there are provided a method of achieving an operation by sequentially selecting menu items arranged in a plurality of menu levels, a program executable by a computer to perform such a method, and a recording medium or media storing such a program. The method may include the steps of: generating a menu in which one or more menu items are arranged along a predetermined direction on a display screen (for example, a vertical direction in a window of FIG. 7); and controlling display of the generated menu (for example, display controller of FIG. 6). Further, in the method, a display form of one of the menu levels, which was previously available for selection, changes in response to an operation for shifting the menu level (for example, change of the display form between FIG. 7 and FIG. 8).

According to another embodiment of the present invention, there are provided a method of achieving an operation by sequentially selecting menu items arranged in a plurality of menu levels, a program executable by a computer to perform such a method, and a recording medium or media storing such a program. The method may include the steps of: generating a menu in which one or more menu items are arranged along a first direction on a display screen (for example, a vertical direction in a window of FIG. 7); controlling display of the generated menu (for example, display controller of FIG. 6); and shifting the menu level available for selection along a second direction (for example, a horizontal direction in a window of FIG. 7) in response to a signal indicating a movement in the second direction, the second direction crossing the first direction. In the present method, in response to the shifting of the menu level, a size of a region for displaying one of the menu levels, which was previously available for selection before the shifting of the menu level, is reduced in the second direction, and another menu level, which is currently available for selection after the shifting of the menu level, is displayed by utilizing a part or all of the display region in which the one of the menu levels was displayed, the one of the menu level being previously available for selection before the shifting of the menu level (for example, change of the display form between FIG. 7 and FIG. 8).

The present invention may be applied, for example, to information processing apparatuses that achieve a desired operation by sequentially selecting menu items arranged in a plurality of menu levels.

Figure 1:
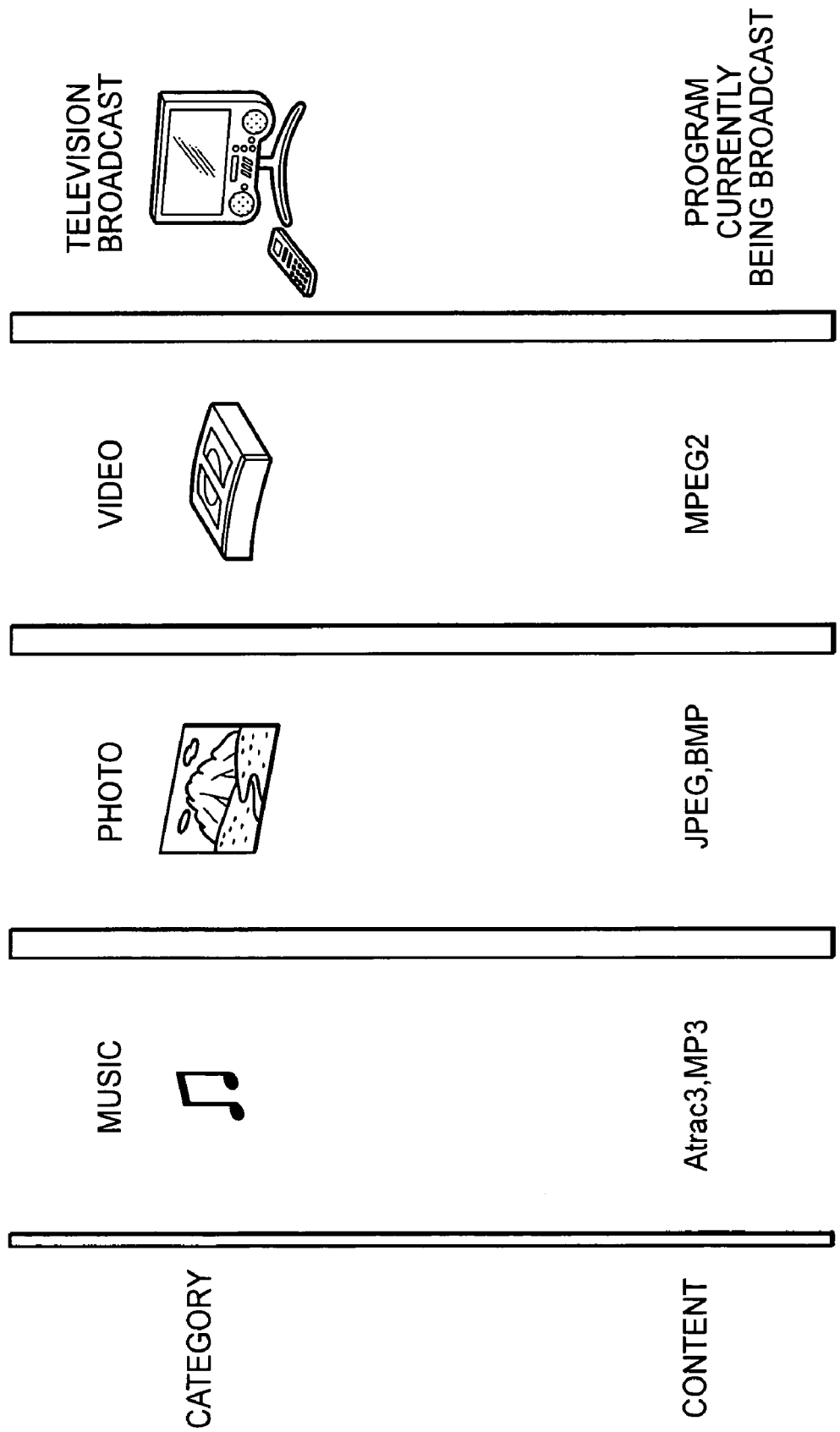
FIG. 1 is a view illustrating processing of a multimedia playback application program.
Figure 2:
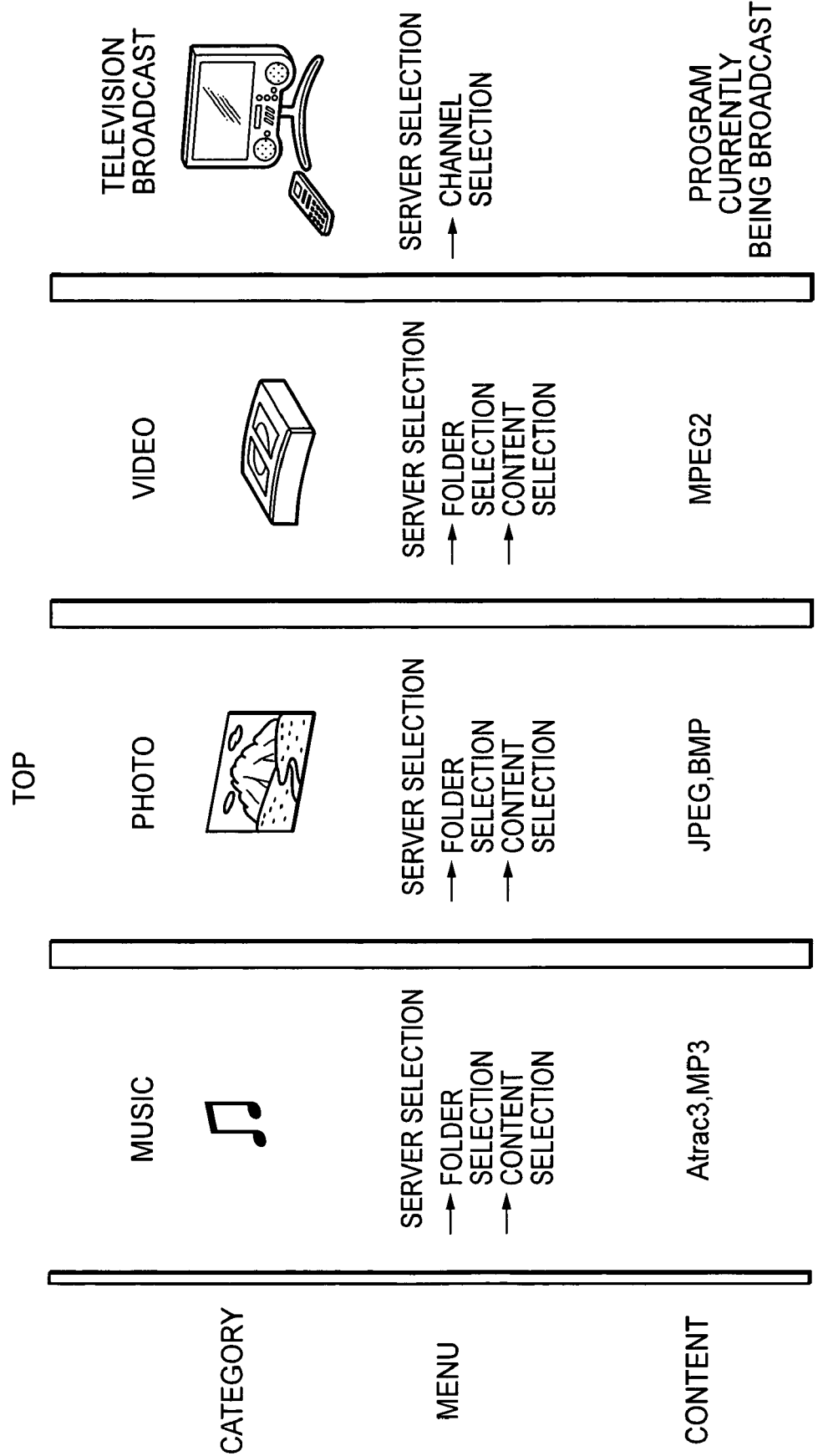
FIG. 2 is a view illustrating a configuration for a menu of a multimedia playback application program.
Figure 3:
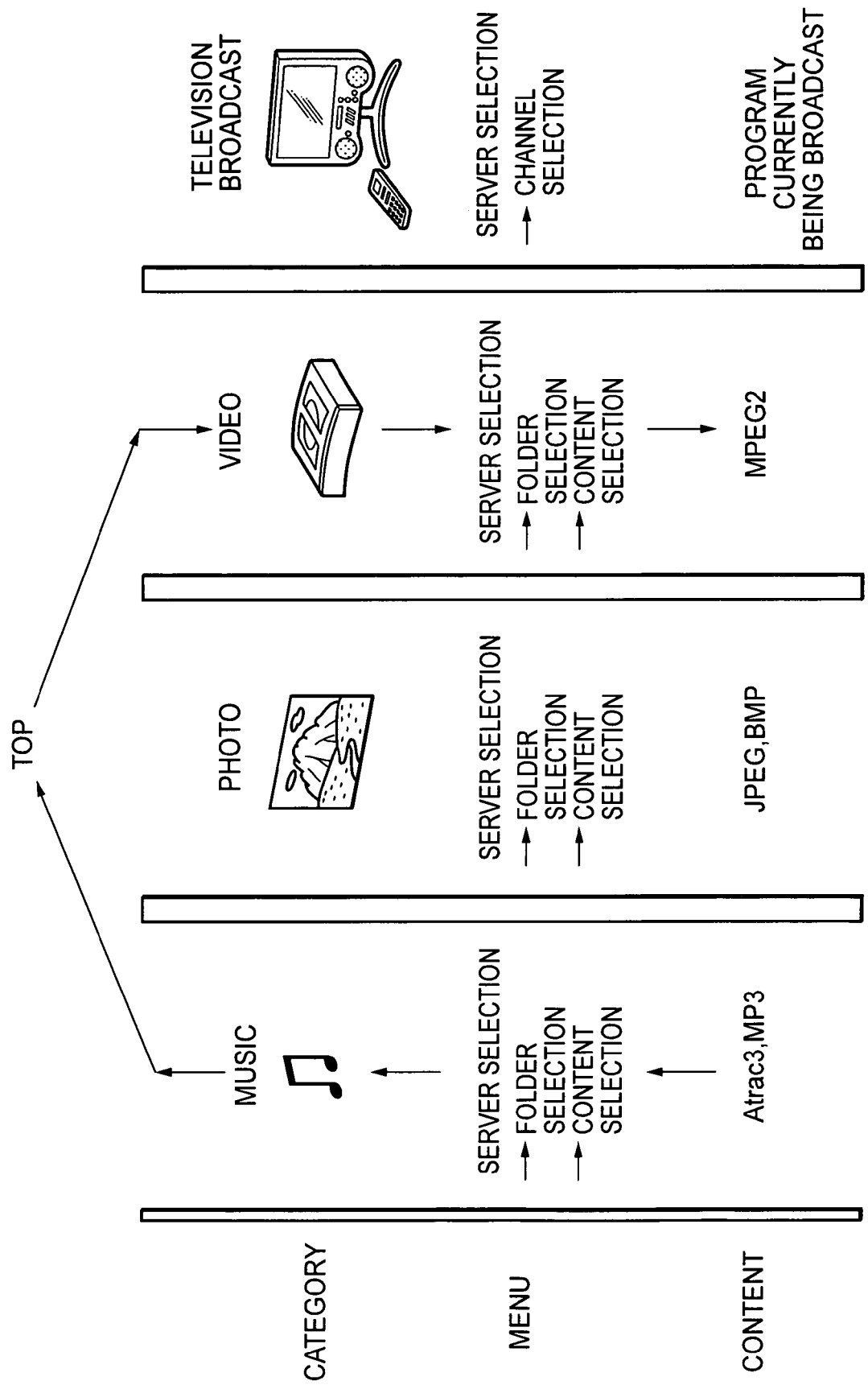
FIG. 3 is a further view illustrating a configuration for a menu of a multimedia playback application program.
Figure 4:
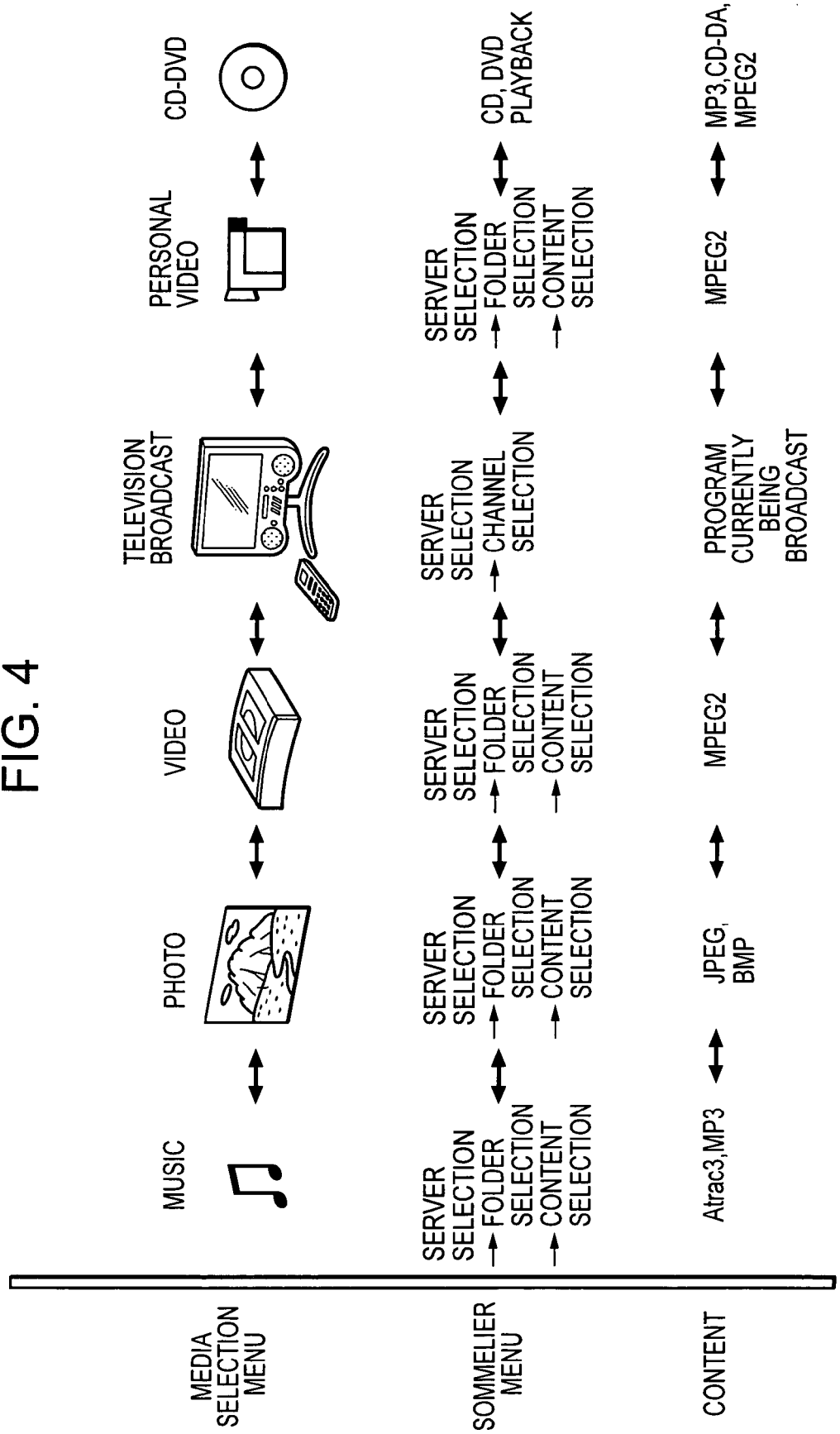
FIG. 4 is a view illustrating selection of content occurring at an multimedia playback application program according to an embodiment of the present invention.

FIG. 4 is a view showing selection of content occurring at a multimedia playback application program according to another embodiment of the present invention.

In a multimedia playback application program according to the present embodiment, which integrally handles various forms of contents such as still picture, moving picture, audio, a user is allowed to perform an operation he/she wishes such as playing back of content by sequentially selecting menu items in each of menus having three levels of a media selection menu, a sommelier menu and a content menu. Although the embodiment shown in FIG. 4 has only three menu levels, the number of the menu levels used in the present invention is not limited to this particular embodiment. The present invention may also be applicable to systems with any number of menu levels.

The media selection menu is a menu that allows a user to make the initial selection in the multimedia playback application program.

In FIG. 4, "music", "photo", "video", "television broadcast", "personal video" and "CD/DVD" are the menu items included in the media selection menu. The menu items serve as categories for classifying content by ways of display or playback of the content or by sources from which the content is obtained. Atrac 3 format content and MP3 format audio content may be recorded as content classified as "music". Further, JPEG format content and BMP format still image content may be recorded as content classified as "photo". MPEG2 format moving image content may be recorded as content classified as "video". MPEG2 format moving image content may also be recorded as content classified as "personal video". MP3 format audio content, CD-DA (Compact Disc Digital Audio) format audio content, and MPEG2 format moving image content may be recorded as content classified as "CD/DVD".

Further, if a user specifies a prescribed channel, a program being broadcast at the designated channel is displayed at a display as content classified as "television broadcast".

The user selects one of menu items from the media selection menu to select one of the media, and selects a desired menu item from a sommelier menu for the selected medium.

The sommelier menu is a menu level positioned between the media selection menu and the content selection menu. In other words, each of menu items that form the sommelier menu indicates a category for classifying contents belong to the selected medium in view of various aspects. For example, if a user selects the menu item of "music" from the media content menu, menu items for classifying music contents such as artist names, album titles, genre (classic, pops, jazz, etc) are displayed in the sommelier menu. Accordingly, a user is allowed to refine the search with the sommelier menu, thereby realizing faster selection of the desired content. It should be noted that each of the menu items constituting the sommelier menu are generated based on the attribute information of content.

Furthermore, the user can realize an operation he/she wishes such as playing back of the desired content by selecting one of the menu items from the sommelier menu and subsequently selecting the desired menu item from the content menu.

Further, if a user selects "television broadcast" as a category from the media selection menu, a program in order to play back content classified as "television broadcast" is selected. A program being broadcast at a designated channel is displayed at the display as a result of designating this desired channel.

Further, at the media selection menu it is possible to select another category under a state where a category is selected without returning to the media selection menu. For example, if "video" is selected as a category from the media selection menu, it is also possible to select other categories such as "photo" from the state where "video" is selected.

For example, at the sommelier menu, it is possible to select another program for playing back content classified under another category from the state where a program is selected, it is possible to select a folder for selecting content classified under another category under a state where a folder is selected, and it is possible to select content for another category under a state where content is selected. For example, it is possible to select content classified under another category under a state (state where content is being played back) where content classified under "music" is selected without returning to the media selection menu.

Figure 5:
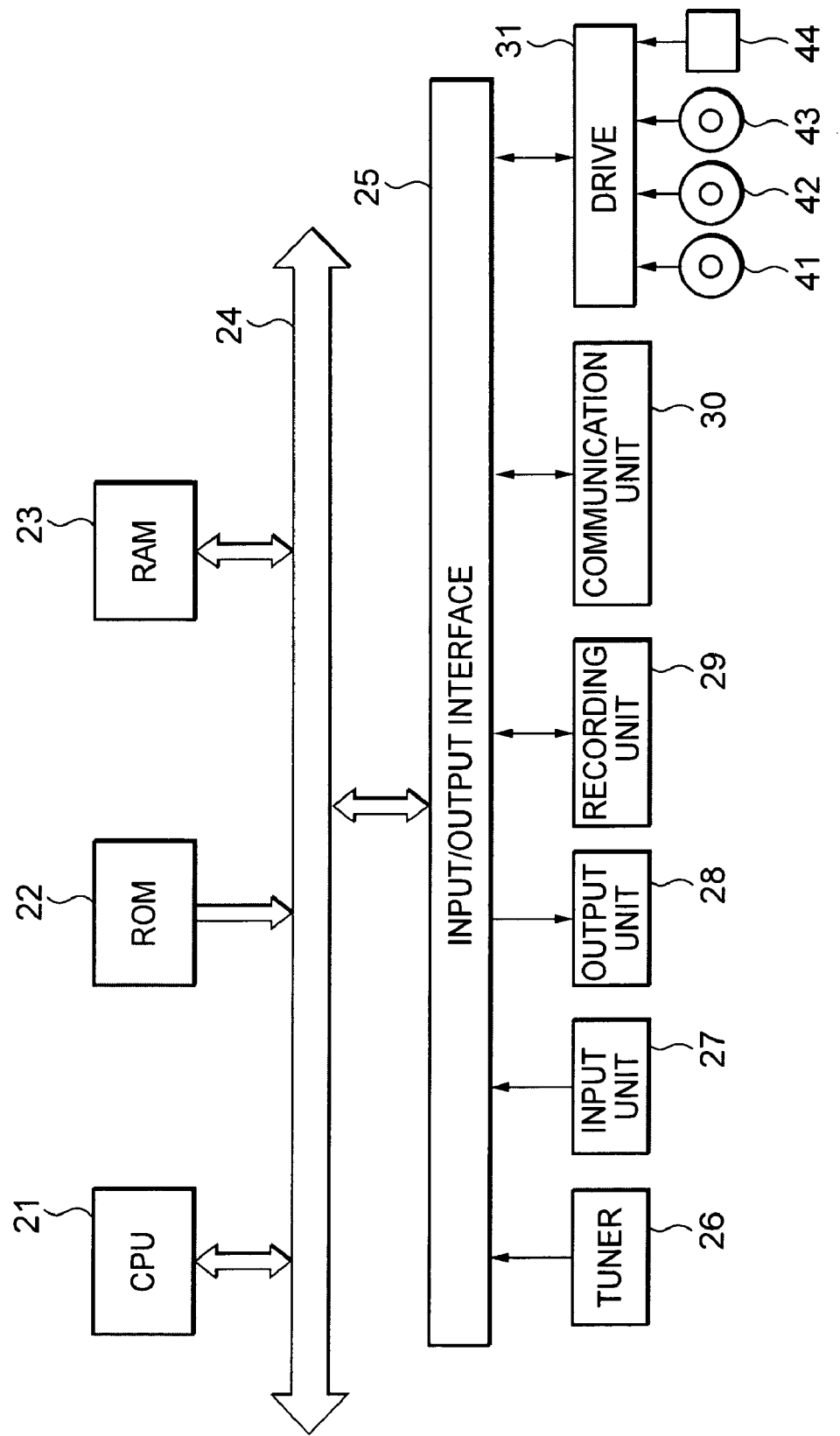
FIG. 5 is a block view showing an example configuration for an information processing apparatus according to an embodiment of the present invention.

FIG. 5 is a block view showing an example configuration for an information processing apparatus according to an embodiment of the present invention.

A CPU (Central Processing Unit) 21 of the information processing apparatus executes various processing in accordance with programs stored in ROM (Read Only Memory) 22 or a recording unit 29. Programs and data etc. executed by the CPU 21 are appropriately stored in RAM (Random Access Memory) 23. The CPU 21, ROM 22 and RAM 23 are connected to each other by a bus 24.

An input/output interface 25 is connected to the CPU 21 via the bus 24. An input unit 27 that may include a tuner 26, keyboard, mouse, switch, remote controller etc. or combination thereof, and an output unit 28 that may include a display, speaker, lamp etc. or combination thereof is connected to the input/output interface 25. The CPU 21 executes various processing corresponding to instructions inputted by the input unit 27.

The tuner 26 receives electromagnetic radiation in the form of land broadcast or satellite broadcast, acquires content constituted by broadcast programs, and provides the content to the CPU 21 or the recording unit 29.

The recording unit 29 connected to the input/output interface 25 is configured, for example, from a hard disc etc., and is recorded with programs executed by the CPU 21 and various data. A communication unit 30 communicates with external apparatuses via communication networks such as the Internet and other networks etc.

Further, programs may be acquired via the communication unit 30 and recorded on the recording unit 29.

If a magnetic disc 41, optical disc 42, magneto-optical disc 43 or semiconductor memory 44 is installed in the drive 31 connected to the input/output interface 25, these are driven and recorded programs and data are acquired. The acquired programs and data are transferred to the recording unit 29 as necessary, and recorded.

Figure 6:
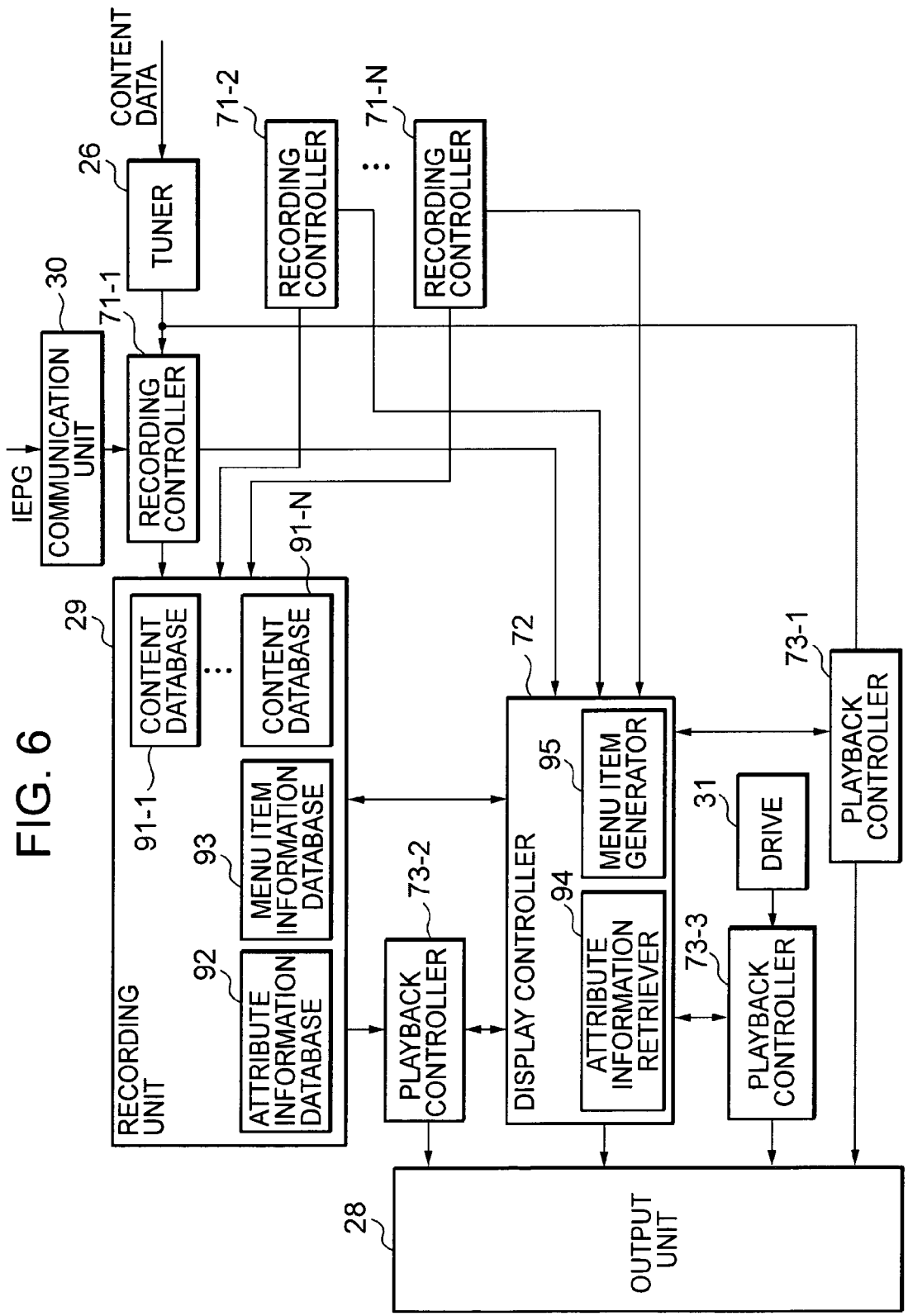
FIG. 6 is a block view showing a configuration for a function of an information processing apparatus according to an embodiment of the present invention.

FIG. 6 is a block view showing a functional configuration for an information processing apparatus according to an embodiment of the present invention for executing a multimedia playback application program, a content recording application program, and a content playback application program.

Recording controller 71-1 to recording controller 71-N are implemented by executing the content recording application program. Display controller 72 is implemented by executing the multimedia playback application program. Playback controller 73-1 to playback controller 73-3 are implemented by executing the content playback application program.

In the following, recording controller 71-1 to recording controller 71-N are simply referred to as recording controller 71 if distinction of individual one is not necessary. Further, in the following, playback controller 73-1 to playback controller 73-3 are simply referred to as playback controller 73 if distinguishing individually is not necessary.

For example, the tuner 26 receives a broadcast signal (content data) constituted by a digital signal sent from a broadcast station via a wireless network. The tuner 26 extracts a broadcast signal for a channel designated by user operation of the input unit 27 and an EPG from the received broadcast signal, provides an extracted broadcast signal to the recording controller 71 and the playback controller 73-1, and provides an extracted EPG to the recording controller 71. The broadcast signal is not limited to being a digital signal, and may also be an analog signal.

The recording controller 71-1 controls the recording unit 29 and records content data acquired from the tuner 26 in content database 91-1. The recording controller 71-1 also provides attribute information for content (described later) to the display controller 72.

The recording controller 71-2 to recording controller 71-N respectively control the recording unit 29 so that content data for content constituted by, for example, still images or audio etc. is recorded in one of content database 91-2 to content database 91-N. The recording controller 71-2 to recording controller 71-N also provide attribute information for content to the display controller 72.

More specifically, for example, if program recording (recording) is designated as a result of a user operating the input unit 27, the recording controller 71-1 generates attribute information for content designated for recording based on iEPG (internet Electronic Program Guide) received by and provided by the communication unit 30 or on EPG provided by the tuner 26, and provides the generated attribute information to the display controller 72.

The recording controller 71 may acquire both iEPG and EPG, or may acquire either one of iEPG and EPG.

Here, attribute information is information indicating attributes of content and may be used when classifying content into categories. The attribute information is so-called metadata for content and displays, for example, content name, genre, name of manufacturer, names of cast, name of writer, name of composer, representative still image, duration, date of manufacture, and content format, etc.

More specifically, for example, if the content is a moving image classified under television broadcast program or video, the recording controller 71 generates attribute information containing a flag (hereinafter referred to as a "playback complete flag") indicating the title, channel, broadcast time, and genre contained in the iEPG or EPG and whether or not the content has been watched yet and a flag (hereinafter referred to as an "automatic deletion flag") indicating whether or not the content is to be deleted after a fixed period.

A set playback complete flag indicates that content has been played back at least once, and a reset playback complete flag indicates that the content has not yet been played back. A set automatic deletion flag indicates that content is to be deleted after a fixed period of time, and a reset automatic deletion flag indicates that content is not to be deleted after a fixed period of time.

In the event of recording new content data, the recording controller 71 generates attribute information containing a reset playback complete flag. The recording controller 71 sets the automatic deletion flag if a user indicates through operation of the input unit 27 that content is to be deleted after a fixed period of time, and resets the automatic deletion flag if it is indicated that content is not to be deleted after a fixed period of time.

Further, if the content is audio, images, or images taken using a personal video camera, attribute information is generated based on information indicating attributes of content contained in content data. For example, in the case of audio, the recording controller 71-2 generates attribute information containing artist name, name of album in which the content is included, genre, and a reset playback complete flag.

In the event that the content is a still image, for example, the recording controller 71-3 (not shown) generates attribute information containing the date of taking the content, the day the content was taken, and the name of the folder the content is recorded in.

In the event that the content is a moving image taken by a personal video camera, the recording controller 71-4 (not shown) generates attribute information containing, for example, a title for the content (file name), the date taken, and a reset playback complete flag.

For example, if recording of a program id designated as a result of a user operating the input unit 27, the recording controller 71-1 supplies generated attribute information to a display controller 72 and provides a broadcast signal (content data) provided by the tuner 26 to the recording unit 29. The recording controller 71-1 controls the recording unit 29 and records the provided content data in content database 91-1 of the recording unit 29. Further, the recording controller 71-1 provides the generated attribute information to the recording unit 29 and records the provided attribute information in attribute information database 92 of the recording unit 29.

More specifically, the recording controller 71-1 provides a broadcast signal (content data) for a program provided by the tuner 26 and generated attribute information to the recording unit 29, controls the recording unit 29, records the provided content data in a folder designated by the user through operation of the input unit 27 corresponding to the content database 91-1, and records the provided attribute information in the attribute information database 92.

In the following, if individual discrimination is not necessary, content database 91-1 to content database 91-N are simply referred to as content database 91.

If the broadcast signal is an analog signal, the recording controller 71 converts a broadcast signal (content data) for a program provided by the tuner 26 from an analog signal to a digital signal. The recording controller 71 encodes the broadcast signal converted to a digital signal using a prescribed method, the encoded broadcast signal is provided to the recording unit 29, the recording unit 29 is controlled, and the provided broadcast signal is recorded in the content database 91. The recording controller 71 encodes broadcast signals using, for example, formats such as MPEG2 or MPEG4 etc.

In the event that recording of a program is not designated as a result of user operation of the input unit 27, the recording controller 71 discards the content data provided by the tuner 26.

Further, the recording controller 71 controls the recording unit 29 so as to delete (erase) content designated as a result of user operation of the input unit 27 from the content database 91. The recording controller 71 also controls the recording unit 29 so that attribute information for content deleted by the recording unit 29 is deleted from the attribute information database 92.

For example, if an application program for recording data constituted by moving images classified under video is started up, the recording controller 71 refers to the attribute information database 92, and controls the recording unit 29 so that content corresponding to attribute information where a flag indicating whether or not content to be deleted after a fixed period of time is present is set is deleted (erased) from the content database 91.

The communication unit 30 transmits and receives data via a communication network. The communication unit 30 makes a request for iEPG to a providing apparatus (not shown). The communication unit 30 receives iEPG transmitted via the communication unit and provides received iEPG to the recording controller 71.

The recording unit 29 records content data, attribute information, and menu item information. The recording unit 29 is equipped with the content database 91, attribute information database 92, and menu item information database 93.

The recording unit 29 provides content data designated as a result of a user operating the input unit 27 to the playback controller 73-2.

Further, the recording unit 29 records content data provided by the recording controller 71-1 to recording controller 71-N in content database 91-1 to content database 91-N of the recording unit 29 under the control of the recording controller 71-1 to recording controller 71-N.

More specifically, content data recorded in content database 91-1 to content database 91-N is recorded in folders corresponding to content database 91-1 to content database 91-N, respectively.

The recording unit 29 also deletes content data recorded in content database 91-1 to content database 91-N under the control of the recording controller 71-1 to recording controller 71-N.

The content database 91-1 to content database 91-N of the recording unit 29 are respectively recorded with moving image content data provided by the recording controller 71 and still image, audio or moving image content data provided by a content recording application program (not shown).

For example, the content database 91-1 is recorded with moving image content data classified as "video". The content database 91-2 is recorded with audio content data classified as "music".

The recording unit 29 records attribute information provided by the recording controller 71 in the attribute information database 92 under the control of the recording controller 71. The recording unit 29 also deletes attribute information for deleted content from the attribute information database 92 of the recording unit 29 under the control of the recording controller 71.

The recording unit 29 records menu item information provided by the display controller 72 in the menu item information database 93 of the recording unit 29 under the control of the display controller 72. The recording unit 29 supplies recorded attribute information an menu item information to the display controller 72. Further, the recording unit 29 deletes menu items and information indicating which content belongs to a menu item recorded in the menu item information database 93 under the control of the display controller 72.

The menu item information includes information displaying a menu item in a menu selection screen of a multimedia playback application program and information indicating which content belongs to each menu item.

The menu item information database 93 of the recording unit 29 records menu item information corresponding to content data recorded in the content database 91.

The display controller 72 classifies content under categories based on words (keywords) contained in attribute information provided by the recording controller 71, and generates menu items indicating the categories for each of the menu levels. Further, the display controller 72 shifts the menu level available for selection in response to a user's operation on the input unit 27, and controls the output unit 28 to change a display form of a predetermined menu level in response to the shift of the menu level. Further, the display controller 72 outputs image signals provided by the playback controller 73-1 to playback controller 73-3 at the output unit 28. The display controller 72 is equipped with an attribute information retriever 94 and a menu item generator 95.

The display controller 72 acquires menu item information from the recording unit 29 in the event of attribute information being supplied from the recording controller 71. The attribute information retriever 94 of the display controller 72 detects whether or not keywords contained in attribute information supplied from the recording controller 71 are keywords classified under menu items recorded in the menu item information database 93 based on attribute information supplied from the recording controller 71 and menu item information acquired from the recording unit 29, and determines whether or not a keyword not classified under menu items recorded in the menu item information database 93 is contained in the attribute information supplied from the recording controller 71.

In the event that it is determined that a keyword not classified under menu items recorded in the menu item information database 93 is contained in the attribute information supplied from the recording controller 71, the menu item generator 95 of the display controller 72 generates a new menu item for the content acquired by the recording controller 71 to belong to for keywords that are not classified. The display controller 72 generates information indicating which content belongs to the new menu item generated by the menu item generator 95 of the display controller 72.

It is possible for content to belong to a number of menu items or to belong to a single menu item.

In the event that it is determined that keywords not classified under menu items recorded in the menu item information database 93 are not contained in attribute information supplied from the recording controller 71, the display controller 72 generates (updates) information indicating which content belongs to each menu item so that content acquired by the recording controller 71 is contained under a classified menu item.

The display controller 72 records the generated menu item information at the same hierarchical layer in the menu item information database 93 at the recording unit 29.

In the event that content recorded in the content database 91 is deleted (erased), the display controller 72 refers to the menu item information database 93 and determines whether or not other content belongs to the menu item the deleted content belonged to.

In the event that other content does not belong to the menu item the deleted content belonged to, the display controller 72 controls the recording unit 29 so that the menu item the deleted content belonged to and the attribute information for the deleted content are deleted. Further, if it is determined that other content belongs to the menu item the deleted content belonged to, the display controller 72 deletes attribute information for the deleted content at the recording unit 29 but the menu item the deleted content belonged to is not deleted.

The display controller 72 acquires menu item information from the menu item information database 93 and generates an image signal for display at the media selection menu based on the acquired menu item information. The display controller 72 provides the generated image signal to the output unit 28.

Upon selection of one of the menu items in the media selection menu by the input unit 27, the display controller 72 shifts the menu level available for selection from the media selection menu to the sommelier menu. Further, the display controller 72 obtains menu item information from the menu item information database 93, generates a signal or signals for causing display of the sommelier menu based on the obtained menu item information, and generates a signal or signals for causing change of a display form of the media selection menu. In the present embodiment, the change of display form includes predetermined differences in menu level displays between before and after of the shifting of the menu level available for selection. More specifically, the change may include, for example, changing of display position within the output unit 28 at respective menu levels, changing of length or height within the output unit 28, changing of size or color of icons or text information that are displayed as respective menu items, changing of background color of a certain menu level or menu item, or deletion of one or more of the menu items other than a certain menu item. These various forms of the change may be employed separately or in combination. The display controller 72 provides the generated signal to the output unit 28.

The display controller 72 generates, in addition to the signal for displaying the sommelier menu, a signal or signals for displaying icon or text information, which indicate a content menu belonging to respective categories (menu items) that constitute the sommelier menu. Further, the display controller 72 moves a menu item within the sommelier menu by obtaining corresponding menu item information from the menu item database 93 in response to each instruction of such a menu item movement indicated by the input unit 27. It should be noted that it may not be necessary to display all of content belong to respective categories (menu items) included in the sommelier menu. Accordingly, a user may be able to refine searching of content while confirming content or content's type in respective categories (menu items).

Upon selection of one of the menu items in the sommelier menu by the input unit 27, the display controller 72 shifts the menu level available for selection from the sommelier selection menu to the content menu. Further, the display controller 72 obtains menu item information from the menu item information database 93 and attribute information of content from the attribute information database 92. Further, the display controller 72 generates a signal or signals for causing display of the content menu based on the obtained menu item information and the attribute information, and generates a signal or signals for causing change of a display form of the sommelier menu. The change of display form may include, for example, deletion of the sommelier menu itself. The display controller 72 provides the generated signal to the output unit 28.

The display controller 72 instructs the playback controller 73-1 to the playback controller 73-3 to playback content that is designated by the menu item selected by the input unit 27 from the content menu.

Further, the display controller 72 provides image signals provided by the playback controller 73-1 to playback controller 73-3 to the output unit 28.

Further, if a signal indicating playback of other content during playback of content is provided, the display controller 72 carries out processing to stop content playback in order to stop playback of content being played back. Details of the processing to stop content playback are described in the following.

In the event that display (playback) of a program is designated as a result of a user operating the input unit 27, the playback controller 73-1 decodes a broadcast signal supplied by the tuner 26 using a prescribed method, supplies an image signal for the decoded broadcast signal to the display controller 72, and supplies an audio signal for the decoded broadcast signal to the output unit 28. The playback controller 73-1 decodes the broadcast signal using a format such as, for example, MPEG 4 etc.

Here, the image signal may be taken to be, for example, an SD (Standard Definition) format or HD (High Definition) format image signal.

In the event that the broadcast signal supplied by the tuner 26 is an analog signal, the playback controller 73-1 converts the supplied broadcast signal from an analog signal to a digital signal, supplies an image signal for a broadcast signal constituted by the converted digital signal to the display controller 72, and supplies an audio signal for the broadcast signal constituted by the converted digital signal to the output unit 28. The audio signal may be taken to be, for example, an audio signal sampled at a sampling frequency of 44.1 kHz.

In the event that display of a program is not designated as a result of user operation of the input unit 27, the playback controller 73-1 discards the broadcast signal provided by the tuner 26.

In the event that an image signal is supplied to the display controller 72, the playback controller 73-1 generates a signal designating the displaying (playing back) of content, and generated signal indicating the playing back of content is supplied to the display controller 72. In the event that the playback controller 73-2 or playback controller 73-3 supplies a signal indicating playback of content to the display controller 72 while content is being played back, the playback controller 73-1 stops playback of the content under the control of the display controller 72.

In the event that playback of content is instructed as a result of a user operating the input unit 27, the playback controller 73-2 acquires content data from content database 91-1 to content database 91-N, and decodes the acquired content data using a prescribed method. The playback controller 73-2 supplies an image signal for decoded content data to the display controller 72 and an audio signal for the decoded content data to the output unit 28. The playback controller 73-2 decodes content data using formats such as, for example, Atrac3, MP3, JPEG, BMP and MPEG2 etc.

In the event that an image signal is supplied to the display controller 72, the playback controller 73-2 generates a signal designating playing back of content, and the generated signal indicating the playing back of content is supplied to the display controller 72. In the event that the playback controller 73-1 or playback controller 73-3 supplies a signal indicating playback of content to the display controller 72 while content is being played back, the playback controller 73-2 stops playback of the content under the control of the display controller 72.

If a magnetic disc 41, optical disc 42 (including CD-ROMs (Compact Disc-Read Only Memory) and DVDs (Digital Versatile Discs)), a magneto-optical disc 43 or semiconductor memory 44 is installed, these are driven by the drive 31 so that recorded content data is acquired. The drive 31 supplies the acquired content data to the playback controller 73-3.

In the event that playback of content is designated as a result of a user operating the input unit 27, the playback controller 73-3 reads in content data supplied by the drive 31 and decodes the read-in content data using a prescribed method. The playback controller 73-2 supplies an image signal for decoded content data to the display controller 72 and an audio signal for the decoded content data to the output unit 28. The playback controller 73-3 decodes content data using formats such as, for example, MP3, and MPEG2 etc.

In the event that an image signal is supplied to the display controller 72, the playback controller 73-3 generates a signal designating playing back of content, and the generated signal indicating the playing back of content is supplied to the display controller 72. In the event that the playback controller 73-1 or playback controller 73-2 supplies a signal indicating playback of content to the display controller 72 while content is being played back, the playback controller 73-3 stops playback of the content under the control of the display controller 72.

In the following, playback controller 73-1 to playback controller 73-3 are simply referred to as playback controller 73 if distinguishing individually is not necessary. In the following, if individual discrimination is not necessary, content database 91-1 to content database 91-N are simply referred to as content database 91.

The output unit 28 outputs signals and audio signals supplied from the display controller 72 and the playback controller 73. For example, a display that serves as the output unit 28 forms a screen image in accordance with the signals supplied from the display controller 72. Further, for example, a speaker constituted by the output unit 28 outputs audio signals provided by the playback controller 73.

Next, a description is given with reference to FIG. 7 to FIG. 16 of images displayed at the output unit 28 constituted by a display using the multimedia playback application program.

If a user operates the input unit 27 so as to designate (select) execution of the multimedia playback application program, a signal corresponding to operation is supplied from the input unit 27 to the CPU 21, and the CPU 21 therefore starts up the multimedia playback application program. If the multimedia playback application program starts up, the output unit 28 displays a window 111 shown in FIG. 7 at a display constituted by the output unit 28.

Figure 7:
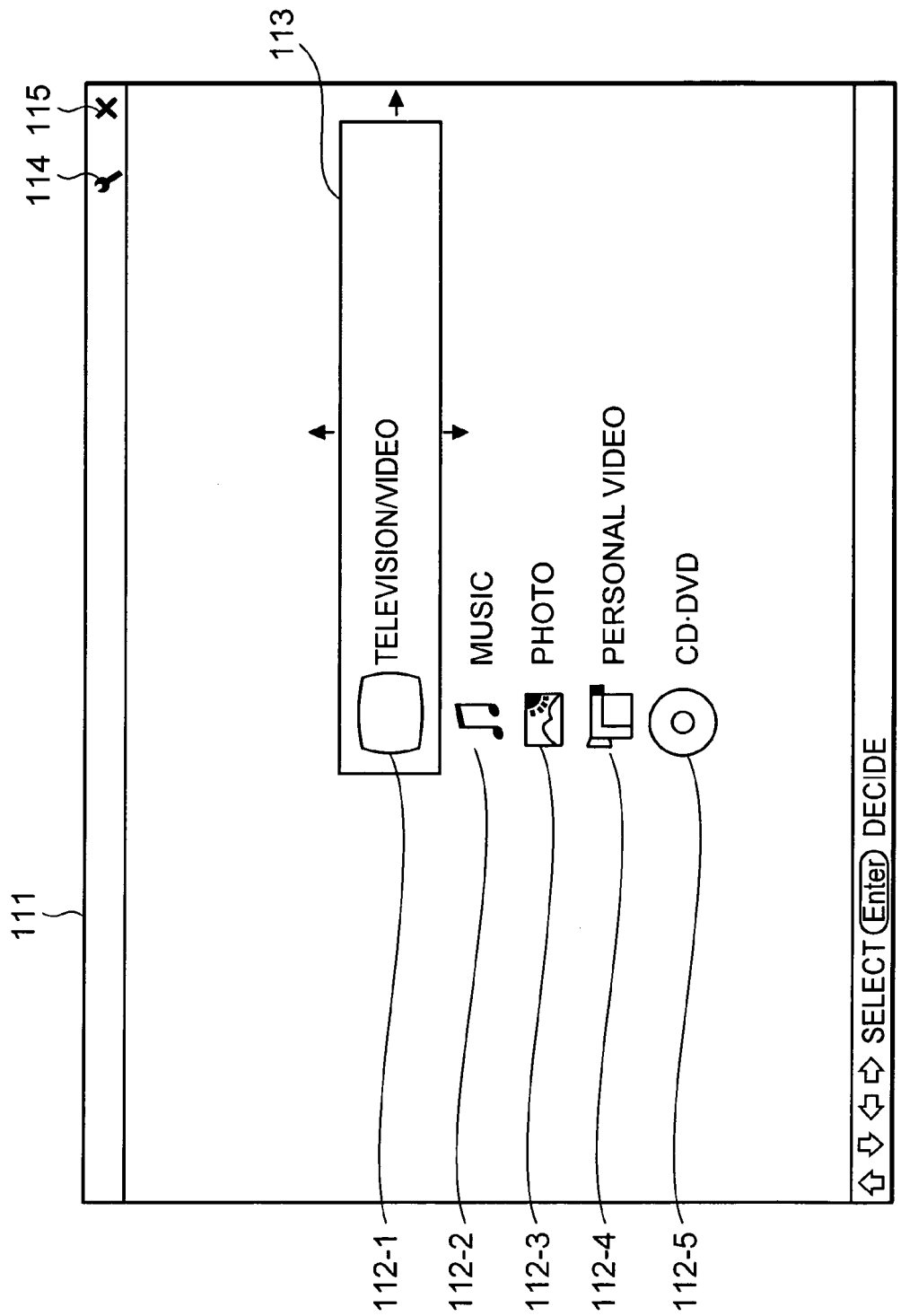
FIG. 7 is a view showing an example of a media selection menu.

The media selection menu for the multimedia playback application program is displayed at the window 111 shown in FIG. 4. The button 112-1, button 112-2, button 112-3, button 112-4 and button 112-5 are displayed along a up/down direction of the window 111, i.e. the vertical direction at the media selection menu as menu items. Although, in the example of FIG. 7, each of the buttons is formed from an icon representing the media and text data, the present invention is not limited to this particular example. Alternatively, the button may be formed only from the icon or the text data. The user operates the input unit 27 so that a cursor 113 is moved on the media selection menu and a collection of desired content is selected by selecting one of the buttons 112-1 to 112-5. Alternatively, the buttons 112-1 to 112-5 may be moved in the up/down direction in response to an operation of the input unit 27, and may be set to a state in which the buttons displayed in predetermined position are made available for selection, i.e. a state in which the shifting of the menu level is permitted. In either case, it is preferable that the button available for selection is displayed in a different manner than the other button so as to enable the distinction among the buttons, for example, by forming a frame around the button as shown in FIG. 7.

The button 112-1 is a button for selecting content (for example, content classified as "video") constituted by a program for a television broadcast. An image that reminds a user of a television broadcast and the characters "television/video" are displayed at the button 112-1. Content constituted by programs for television broadcasts constitute a single collection (hereinafter referred to as a "broadcast video collection").

The button 112-2 is a button for selecting content (for example, content classified as "music") constituted by music (audio data). An image that reminds a user of music and the characters "music" are displayed at the button 112-2. Content constituted by music constitutes a single collection (hereinafter referred to as "music collection").

The button 112-3 is a button for selecting content (for example, content classified as "photo") constituted by still images. An image that reminds a user of a photograph and the characters "photo" are displayed at the button 112-3. Content constituted by still images constitutes a single collection (hereinafter referred to as "photo collection").

The button 112-4 is a button for selecting content (for example, content classified under "personal video") constituted by moving images taken with a personal video camera. An image that reminds a user of a personal video camera and the characters "personal video" are displayed at the button 112-4. Content constituted by moving images taken with a personal video camera constitute a single collection (hereinafter referred to as a "personal video collection").

The button 112-5 is a button for selecting content constituted by music or images recorded on a CD (Compact Disc) or DVD. An image that reminds a user of a CD or DVD and the characters "CD/DVD" are displayed at the button 112-5. Content constituted by music or images recorded on CDs or DVDs constitutes a single collection (hereinafter referred to as "DVD collection").

If individual discrimination is not necessary, the buttons 112-1 to 112-5 are referred to simply as "button 112".

For example, if the user operates a mouse constituting the input unit 27 so as to select the button 112-2 of a menu item from the media selection menu, the pointer displayed at the output unit 28 is moved onto the button 112-2 by operation of the mouse, and the cursor 113 is moved to the button 112-2 as a result of clicking on the button 112-2. The user selects the button 112-2 by double-clicking on the button 112-2. Here, "click" refers to the operation of pressing a left button of a mouse down and releasing the button, and "double-click" refers to the operation of clicking two times in rapid succession (within a fixed period of time).

Further, if a close button 115 in the upper right of the window 11 is clicked, the window 111 is closed, and the CPU 21 ends execution of the multimedia playback application program. If a folder setting dialogue button 114 in the upper right of the window 111 is clicked, the output unit 28 displays a folder setting dialogue window at the display of the output unit 28. The details of this folder setting dialogue are described in the following.

In the event that the cursor 113 is moved using a keyboard, as shown in the lower left of the window 111, if an "up arrow" key of a keyboard is pressed, the cursor 113 moves one menu item up, and if a "down arrow" key is pressed, the cursor 113 moves one item down. Further, if a "right arrow" key of a keyboard is pressed, the cursor 113 moves one menu item to the right, and if a "left arrow" key is pressed, the cursor moves one menu item to the left. If an "Enter" key is pressed, a menu item where the cursor is displayed is selected.

Therefore, for example, if the button 112-3 of a menu item is selected using a keyboard of the input unit 27, the button 112-3 is selected as a result of a user pressing an "up arrow" key or a "down arrow" key of the keyboard so that the cursor is moved to the button 112-3 and pressing an "Enter" key.

Further, if a "down arrow" key of a keyboard is pressed while the button 112-1 for the menu item being designated by the cursor 113, the cursor 113 is moved to the button 112-2, and similarly, if an "up arrow" key of a keyboard is pressed with the cursor 113 displayed at the button 112-2, the cursor 113 is moved to the button 112-1.

In the event that a remote controller is used as the input unit 27, a button of a menu item may be selected in similar way as in the case where the keyboard is used. In other words, the remote controller may be provided with buttons respectively corresponding to up, down, right and left direction, and the button for a menu item may be selected by operation of these buttons. In this example, it may also be possible to move the entire portion of menu item array in up or down direction in response to an instruction for movement, and make the selection of the menu item displayed in a predetermined position at the window 111 possible, or may be possible to allow the shifting of the menu level.

In the event that the button 112-1 is selected or a "right arrow" key of the keyboard is pressed while the cursor 113 designating the button 112-1 for the menu item, the sommelier menu, which is in a menu level that is shown as one level lower than that of the media selection menu in FIG. 4, is displayed at the window 111 as shown in FIG. 8, for example. As shown in the figure, in the present embodiment, positions of the buttons for menu items belonging to the same level are arranged along the up/down direction, and the menus of the adjacent menu levels are displayed at adjacent positions in the horizontal direction. Accordingly, the movement operations within the same menu level are performed in response to instructions for movements in the up/down direction while the shifting of the menu level is performed in response to instructions for movements in the right/left direction. Accordingly, the menu level available for selection is shifted from the media selection menu to the sommelier menu. In this respect, in the present embodiment, an operation for instructing a movement in a direction that crosses the direction along which the menu items are arranged also functions as a selection operation of a menu.

In the present embodiment, the display form of the media selection menu that was previously available changes, for example, as shown in a transition from FIG. 7 to FIG. 8, together with a transition that makes the sommelier menu newly available. More specifically, buttons other than the button 112-1 of the menu item selected in the media menu are deleted. In the present example, the button 112-2 to button 112-5 are deleted. Further, the text information of "television/video" and a corresponding icon, which are arrayed and displayed in a right/left direction in the media selection mode, are rearranged and displayed to array in a up/down direction, and display regions therefore are reduced in the right/left direction than the media selection mode.

In the present embodiment, the display region may be a region or regions within the window 111 for displaying icons or text information or both for respective menu items, and the reduction of display region may be realized by decreasing or reducing a length, width, height, etc of the display region. Accordingly, in this respect, for example, reduction of a font size with the shifting of the menu level may correspond to the reduction of display region. As an example, if the menu item includes text information and/or other type of information, a reduction of the font size with the shifting of the menu level may reduce the display region.

Further, the display position of the icon/text information within the window 111 moves to left so as to utilize part of the display region used for displaying the media selection menu, thereby displaying the sommelier menu.

Content of the broadcast video collection is classified into one or a plurality of items (hereinafter referred to as broadcast video categories). In FIG. 8, the button 131-1 to button 131-13 are arrayed and displayed along the up/down direction of the window 111 as menu items of the sommelier menu for selecting each classified item.

The button 131-1 is a button for selecting content constituted by television broadcasts being transmitted at the current time, with the characters "live TV" being displayed at the button 131-1. If the button 131-1 is selected, a content menu for selecting content constituted by television broadcasts being broadcast at the current time is displayed at the right side of the sommelier menu.

The button 131-2 is a button for selecting content constituted by externally inputted moving images, with the characters "external input" being displayed at the button 131-2. If the button 131-2 is selected, a content menu for selecting content constituted by externally inputted moving images is displayed at the right side of the sommelier menu. Externally inputted moving images may be, for example, moving images from a DVD playback apparatus connected to the information processing apparatus. In the content menu of the present embodiment, the button 112-1 designating the selected media and the button 131-1 available for selection are displayed at the same or substantially the same height in the window 111.

The button 131-3 is a button for selecting a menu item displaying a program list or images for scheduling program recording, with the characters "program list/recording schedule" being displayed at the button 131-3. If the button 131-3 is selected, a content menu for selecting a menu item displaying an image for a program list and scheduling recording of a program is displayed at the right side of the sommelier menu.

The button 131-4 is a button for selecting content constituted by recently recorded programs, with the characters "recently recorded video" being displayed at the button 131-4. If the button 131-4 is selected, a content menu for selecting content constituted by recently recorded programs is displayed at the right side of the sommelier menu.

The button 131-5 is a button for selecting content constituted by programs, of the recorded programs, that have not yet been watched, with the characters "video that has not been watched yet" being displayed at the button 131-5. If the button 131-5 is selected, a content menu for selecting content constituted by programs, of the recorded programs, that have not been watched yet, is displayed at the right side of the sommelier menu.

The button 131-6 is a button for displaying a menu item for classifying recorded programs according to genre, with the characters "genre" being displayed at the button 131-6. If the button 131-6 is selected, a menu item classifying recorded programs according to genre is displayed at the right side of the sommelier menu.

The button 131-7 is a button for selecting content with a broadcast video category of "drama", with the characters "drama" being displayed at the button 131-7. If the button 131-7 is selected, a content menu for selecting content with a broadcast video category of "drama" is displayed at the right side of the sommelier menu.

The button 131-8 is a button for selecting content with a broadcast video category of "sports", with the characters "sports" being displayed at the button 131-8. If the button 131-8 is selected, a content menu for selecting content with a broadcast video category of "sports" is displayed at the right side of the sommelier menu.

The button 131-9 is a button for selecting content with a broadcast video category of "variety", with the characters "variety" being displayed at the button 131-9. If the button 131-9 is selected, a content menu for selecting content with a broadcast video category of "variety" is displayed at the right side of the sommelier menu.

The button 131-10 is a button for selecting content with a broadcast video category of "movie", with the characters "movie" being displayed at the button 131-10. If the button 131-10 is selected, a content menu for selecting content with a broadcast video category of "movie" is displayed at the right side of the sommelier menu.

The button 131-11 is a button for selecting content, of the recorded programs, that is to be deleted (erased) after a fixed period of time, with the characters "video to be automatically deleted" being displayed at the button 131-11. If the button 131-11 is selected, a content menu for selecting content, of the recorded programs, that are to be deleted (erased) after a fixed period of time is displayed at the right side of the sommelier menu.

The button 131-12 is a button for selecting playing back a television program, with the characters "video server" being displayed at the button 131-12. If the button 131-12 is selected, a list of programs for selecting a server for playing back a television program is displayed at the right side of the sommelier menu.

The button 131-13 is a button for displaying a menu item for classifying recorded programs according to series, with the characters "series" being displayed at the button 131-13. If the button 131-13 is selected, a menu item classifying recorded programs according to series is displayed at the right side of the sommelier menu. For example, a title for a program being continuously broadcast etc. is displayed as a menu item taken as a menu item for classifying according to series.

If individual discrimination is not necessary, buttons 131-1 to 131-13 are referred to simply as "button 131".

Further, if the button 131-1 is selected, a content menu for selecting content constituted by television broadcasts being broadcast at the current time is displayed at the right side of the button 131-1. Button 132-1 to button 132-12 are displayed as menu items for content belonging to the button 131-1.

Button 132-1 is a button for selecting a program for a television broadcast of a channel set to channel 1. Further, button 132-2 is a button for selecting a program of a television broadcast of a channel set to channel 3. Button 132-3 is a button for selecting a program of a television broadcast of a channel set to channel 4. Button 132-4 is a button for selecting a program of a television broadcast of a channel set to channel 6. Button 132-5 is a button for selecting a program of a television broadcast of a channel set to channel 8. Button 132-6 is a button for selecting a program of a television broadcast of a channel set to channel 10. Moreover, button 132-7 is a button for selecting a program of a television broadcast of a channel set to channel 12. Button 132-8 is a button for selecting a program of a television broadcast of a channel set to channel 14. Button 132-9 is a button for selecting a program of a television broadcast of a channel set to channel 16. Button 132-10 is a button for selecting a program of a television broadcast of a channel set to channel 38. Button 132-11 is a button for selecting a program of a television broadcast of a channel set to channel 42. Button 132-12 is a button for selecting a program of a television broadcast of a channel set to channel 46.

Moreover, if a user operates the input unit 27 under a state where the cursor 113 designates the button 131-1 so that the cursor 113 is moved upwards, a menu item for the sommelier menu for the button 112-5 constituting a button for selecting content belonging to a DVD collection is displayed. In the event that a user operates the input unit under a state where the cursor 113 designates the button 131-1 so that the cursor 113 moves downwards, a content menu for selecting content belonging to the button 131-2 is displayed.

Similarly, if a user operates the input unit 27 under a state where the cursor 113 designates the button 131-13 so that the cursor moves in a downward direction, a menu item for the sommelier menu for the button 112-2 constituting a button for selecting content belonging to a music collection is displayed.

In the event that content belonging to the button 131 for each item classifying a broadcast video collection is deleted, a deleted button 131 and an undeleted button 131 exist. For example, if content belonging to the button 131-1, the button 131-3 and the button 131-4 is deleted, the button 131-1, the button 131-3, and the button 131-4 are not deleted. Further, if content belonging to the button 131-2 and the button 131-5 to the button 131-13 is deleted, the button 131-2 and the button 131-5 to the button 131-15 are deleted.

Figure 9:
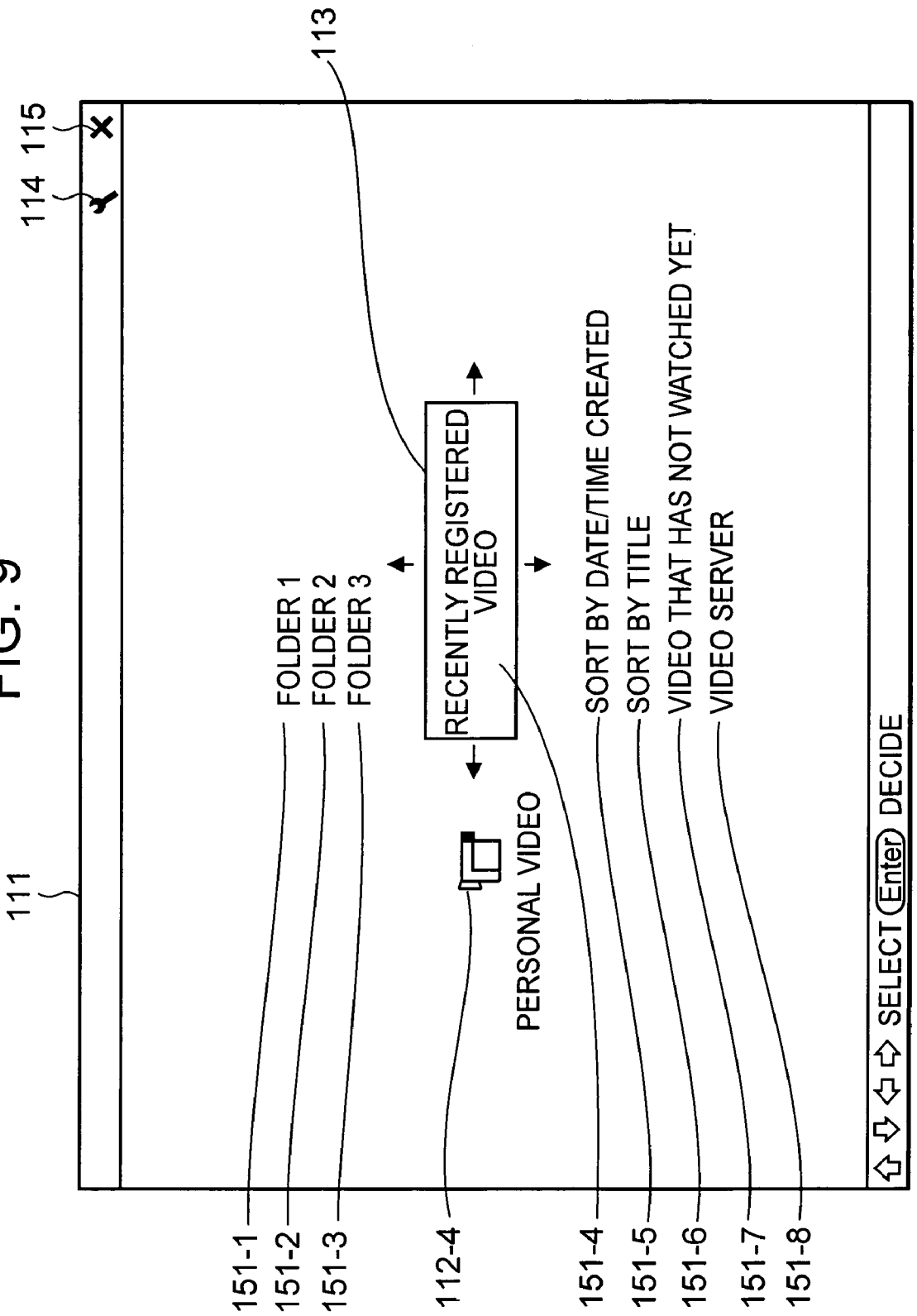
FIG. 9 is a further view showing an example of a sommelier menu.

Further, with the media selection menu shown in FIG. 7, if the button 112-4 is selected or the "right arrow" key of the keyboard is pressed while the button 112-4 of the menu item is being designated, a sommelier menu for selecting content of the personal video collection shown in FIG. 9 is displayed. Content of the personal video collection is classified into one or a plurality of items (hereinafter referred to as personal video categories).

In the present embodiment, the display form of the media selection menu, which was previously available, changes together with a transition that makes the sommelier menu newly available. More specifically, buttons other than the button 112-4 of the menu item selected in the media menu are deleted. In the present example, the button 112-1 to button 112-3 and button 112-5 are deleted. Further, the text information of "personal video" and a corresponding icon, which are arrayed and displayed in a right/left direction in the media selection mode, are rearranged and displayed to array in a up/down direction, and display regions therefore are reduced in the right/left direction than the media selection mode.

Further, the display position of the icon/text information within the window 111 moves to left so as to utilize part of the display region used for displaying the media selection menu, thereby displaying the sommelier menu.

Button 151-1 to button 151-8 are displayed as menu items of the sommelier menu for selecting the personal video category.

Button 151-1 is a button for selecting content in a folder with a folder name of "folder 1", with the characters "folder 1" being displayed at the button 151-1. If button 151-1 is selected, a content menu for selecting content recorded in the folder with a folder name of "folder 1" is displayed at the right side of the sommelier menu.

Button 151-2 is a button for selecting content in a folder with a folder name of "folder 2", with the characters "folder 2" being displayed at the button 151-2. If button 151-2 is selected, a content menu for selecting content recorded in the folder with a folder name of "folder 2" is displayed at the right side of the sommelier menu.

Button 151-3 is a button for selecting content in a folder with a folder name of "folder 3", with the characters "folder 3" being displayed at the button 151-3. If button 151-3 is selected, a content menu for selecting content recorded in the folder with a folder name of "folder 3" is displayed at the right side of the sommelier menu.

The button 151-4 is a button for selecting content, of the content of the personal video collection, within a fixed period from registration of the folder setting dialogue, with the characters "recently recorded video" being displayed at the button 151-4. If the button 151-4 is selected, a content menu for detecting content, from the content of the personal video collection, within a fixed period from registration at the folder setting dialogue is displayed at the right side of the sommelier menu.

Button 151-5 is a button for displaying content of the personal video collection in a list displayed in order of creation date/time of the content, with the characters "sort by date/time created" being displayed at the button 151-5. If button 151-5 is selected, a list displaying the content of the personal video collection in order of creation date/time of the content is displayed at the right side of the sommelier menu.

Button 151-6 is a button for displaying content of the personal video collection in a list displayed in order of content title, with the characters "sort by title" being displayed at the button 151-6. If button 151-6 is selected, a list displaying the content of the personal video collection in order of content title is displayed at the right side of the sommelier menu.

Here, title order may be, for example, lining up titles in the order of the Japanese syllabary.

Button 151-7 is a button for selecting content that has not yet been watched from content of the recorded personal video collection at the folder setting dialogue, with the characters "video that has not been watched yet" being displayed at the button 151-7. If the button 151-7 is selected, at the folder setting dialogue, a content menu for selecting content that has not been watched yet of the content of the recorded personal video collection is displayed at the right side of the sommelier menu.

The button 151-8 is a button for selecting a program for playing back content of a personal video collection, and the characters "video server" are displayed on the button 151-8. If the button 151-8 is selected, a list of programs for selecting a program server for playing back content of a personal video collection is displayed at the right side of the sommelier menu.

If individual discrimination is not necessary, the buttons 151-1 to 151-8 are referred to simply as "button 151".

Further, if the cursor 113 is moved upwards under a state where the cursor 113 designates the button 151-1, a sommelier menu for selecting content of a photo collection is displayed. Similarly, if the cursor 113 is moved downwards under a state where the cursor 113 designates the button 151-8, a sommelier menu for selecting content of a DVD collection is displayed.

In the event that content belonging to button 151-4 and button 151-6 is deleted, button 151-4 and button 151-6 are not deleted. Further, if content belonging to button 151-1 to button 151-3, button 151-5, button 151-7 and button 151-8 is deleted, button 151-1 to button 151-3, button 151-5, button 151-7 and button 151-8 are respectively deleted.

Figure 10:
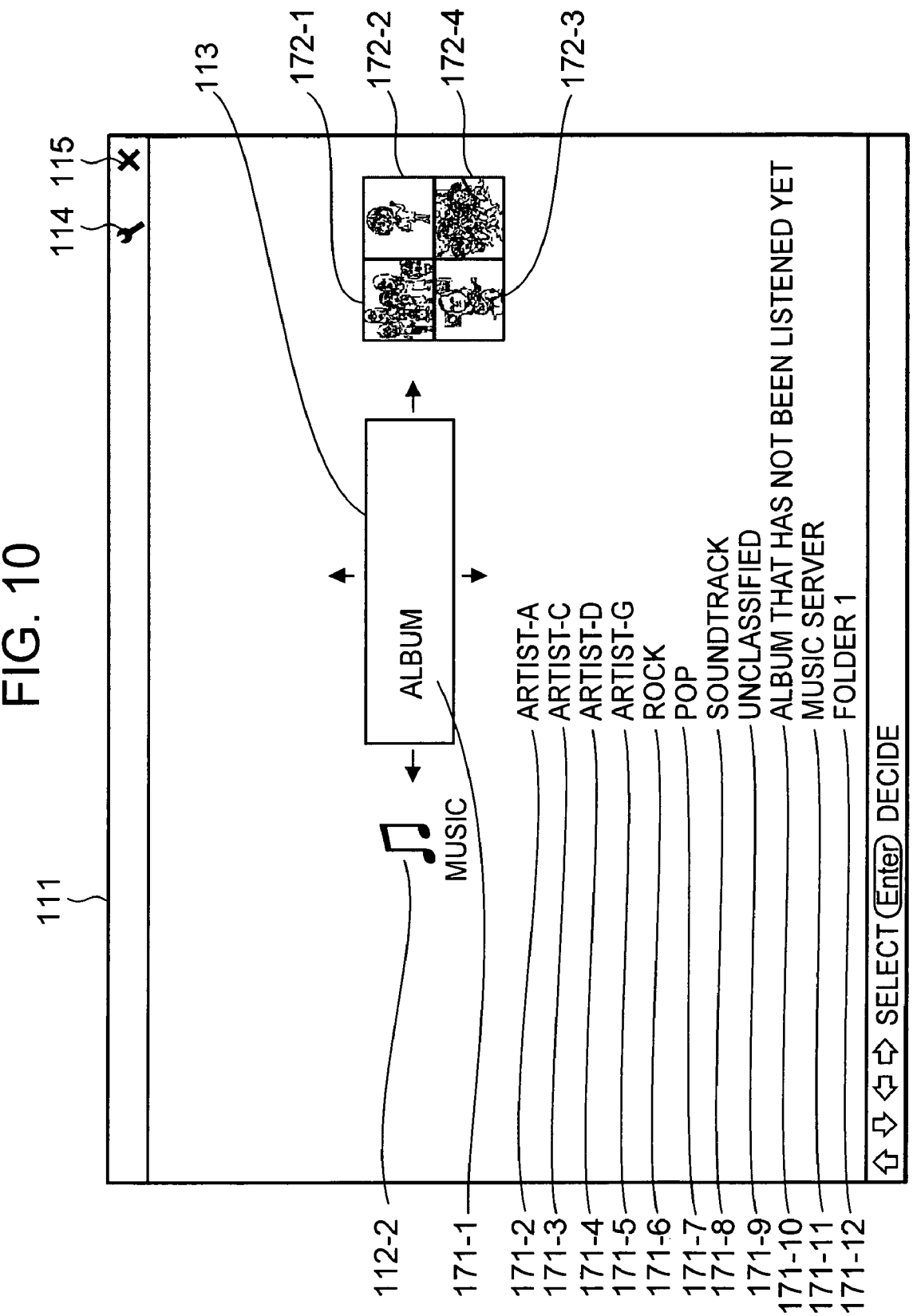
FIG. 10 is another view showing an example of a sommelier menu.

Further, with the media selection menu shown in FIG. 7, if the button 112-2 is selected or the "right arrow" key of the keyboard is pressed while the button 112-2 of the menu item is being designated, a sommelier menu for selecting content of the music collection shown in FIG. 10 is displayed. Content of the music collection is classified into one or a plurality of items (hereinafter referred to as music category).

In the present embodiment, the display form of the media selection menu, which was previously available, changes together with a transition that makes the sommelier menu newly available. More specifically, buttons other than the button 112-2 of the menu item selected in the media menu are deleted. In the present example, the button 112-1 and button 112-3 to button 112-5 are deleted. Further, the text information of "music" and a corresponding icon, which are arrayed and displayed in a right/left direction in the media selection mode, are rearranged and displayed to array in a up/down direction, and display regions therefore are reduced in the right/left direction than the media selection mode.

Further, the display position of the icon/text information within the window 111 moves to left so as to utilize part of the display region used for displaying the media selection menu, thereby displaying the sommelier menu.

Button 171-1 to button 171-12 are displayed as menu items of the sommelier menu for selecting the music category.

Button 171-1 is a button for selecting content, of the recorded music collection content, of the music category "album" at the folder setting dialogue, and the characters "album" are displayed at the button 171-1. If button 171-1 is selected, a content menu for selecting content with a music category of "album" is displayed at the right side of the sommelier menu.

Buttons 172-1 to 172-4 are displayed at a content menu for selecting content of a music category of "album". Images that may remind a user of content corresponding to the buttons 172-1 to 172-4 such as, for example, a jacket image for a CD album are displayed at the buttons 172-1 to 172-4. It should be noted that the content menu may display all of the button 172-1 to button 172-4, or alternatively only some of the buttons may be displayed. If individual discrimination is not necessary, the buttons 172-1 to 172-4 are referred to simply as "button 172".

Further, if button 172 is selected, content corresponding to button 172 is played back.

Button 171-2 is a button for selecting content with a music category of "artist A", with the characters "artist A" being displayed at the button 171-2. If button 171-2 is selected, a content menu for selecting content with a music category of "artist A" is displayed at the right side of the sommelier menu. A list of content of artists with recorded artist names starting with "A" is displayed at a content menu for selecting content of a music category of "artist A".

Button 171-3 is a button for selecting content with a music category of "artist C", with the characters "artist C" being displayed at the button 171-3. If button 171-3 is selected, a content menu for selecting content with a music category of "artist C" is displayed at the right side of the sommelier menu. A list of content of artists with recorded artist names starting with "C" is displayed at a content menu for selecting content of a music category of "artist C".

Button 171-4 is a button for selecting content with a music category of "artist D", with the characters "artist D" being displayed at the button 171-4. If button 171-4 is selected, a content menu for selecting content with a music category of "artist D" is displayed at the right side of the sommelier menu. A list of content of artists with recorded artist names starting with "D" is displayed at a content menu for selecting content of a music category of "artist D".

Button 171-5 is a button for selecting content with a music category of "artist G", with the characters "artist G" being displayed at the button 171-5. If button 171-5 is selected, a content menu for selecting content with a music category of "artist G" is displayed at the right side of the sommelier menu. A list of content of artists with recorded artist names starting with "G" is displayed at a content menu for selecting content of a music category of "artist G".

Button 171-6 is a button for selecting content with a music category of "rock", with the characters "rock" being displayed at the button 171-6. If button 171-6 is selected, a content menu for selecting content with a music category of "rock" is displayed at the right side of the sommelier menu. A list of content classified as so-called rock music is displayed at a content menu for selecting content of a music category of "rock".

Button 171-7 is a button for selecting content with a music category of "pop", with the characters "pop" being displayed at the button 171-7. If button 171-7 is selected, a content menu for selecting content with a music category of "pop" is displayed at the right side of the sommelier menu. A list of content classified as so-called pop music is displayed at a content menu for selecting content of a music category of "pop".

Button 171-8 is a button for selecting content with a music category of "soundtrack", with the characters "soundtrack" being displayed at the button 171-8. If button 171-8 is selected, a content menu for selecting content with a music category of "soundtrack" is displayed at the right side of the sommelier menu. A list of content classified as so-called soundtrack music is displayed at a content menu for selecting content of a music category of "soundtrack".

Button 171-9 is a button for selecting content with a music category of "unclassified", with the characters "unclassified" being displayed at the button 171-9. If button 171-9 is selected, a content menu for selecting content with a music category of "unclassified" is displayed at the right side of the sommelier menu. A list of content classified yet to be classified under genre and artist name is displayed at a content menu for selecting content of a music category of "unclassified".

Button 171-10 is a button for selecting content that has not yet been watched from content of the recorded music collection at the folder setting dialogue, with the characters "albums that have not been listened to yet" being displayed at the button 171-10. If the button 171-10 is selected, at the folder setting dialogue, a content menu for selecting content that has not been watched yet of the content of the recorded music collection is displayed at the right side of the sommelier menu.

Button 171-11 is a button for selecting a program for playing back content of a music collection, and the characters "music server" are displayed on the button 171-11. If the button 171-11 is selected, a list of programs for selecting a server for playing back music collection content is displayed at the right side of the sommelier menu.

Button 171-12 is a button for selecting content in a folder with a folder name of "folder 1", with the characters "folder 1" being displayed at the button 171-2. If button 171-12 is selected, a content menu for selecting content recorded in the folder with a folder name of "folder 1" is displayed at the right side of the sommelier menu.

If individual discrimination is not necessary, the buttons 171-1 to 171-12 are referred to simply as "button 171".

Further, if the cursor 113 is moved upwards under a state where the cursor 113 designates the button 171-1, a sommelier menu for selecting content of a broadcast video collection is displayed. Similarly, if the cursor 113 is moved downwards under a state where the cursor 113 designates the button 171-12, a sommelier menu for selecting content of a photo collection is displayed.

In the event that content belonging to button 171-1 and button 171-10 is deleted, button 171-1 and button 171-10 are not deleted. Further, if content belonging to button 171-2 to button 171-9, button 171-11, and button 171-12 is deleted, button 171-2 to button 171-9, button 171-11, and button 171-12 are respectively deleted.

Figure 11:
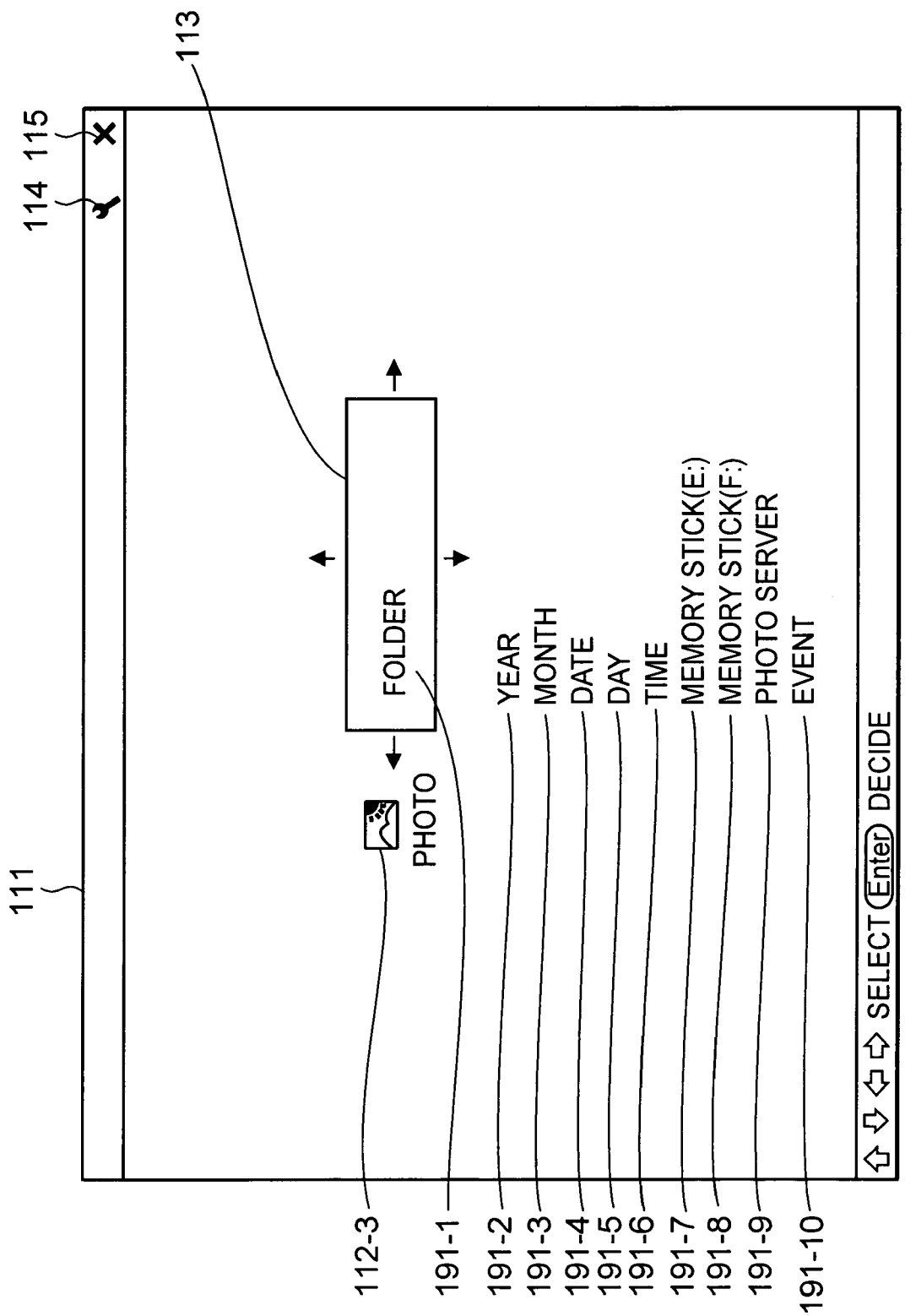
FIG. 11 is a still further view showing an example of a sommelier menu.

Further, with the media selection menu shown in FIG. 7, if button 112-3 is selected or a "right arrow" key of the keyboard is pressed while the button 112-3 of the menu item is being designated, a sommelier menu for selecting content of the photo collection shown in FIG. 11 is displayed. Content of the photo collection is classified into one or a plurality of items (hereinafter referred to as photo categories).

In the present embodiment, the display form of the media selection menu, which was previously available, changes together with a transition that makes the sommelier menu newly available. More specifically, buttons other than the button 112-3 of the menu item selected in the media menu are deleted. In the present example, the button 112-1 to button 112-2 and button 112-4 to button 112-5 are deleted. Further, the text information of "photo" and a corresponding icon, which are arrayed and displayed in a right/left direction in the media selection mode, are rearranged and displayed to array in a up/down direction, and display regions therefore are reduced in the right/left direction than the media selection mode.

Further, the display position of the icon/text information within the window 111 moves to left so as to utilize part of the display region used for displaying the media selection menu, thereby displaying the sommelier menu.

Button 191-1 to button 191-10 are displayed as menu items of the sommelier menu for selecting the photo category.

Button 191-1 is a button for selecting content in a folder with a folder name of "folder", with the characters "folder" being displayed at the button 191-1. If button 191-1 is selected, a content menu for selecting content recorded in the folder with a folder name of "folder" is displayed at the right side of the sommelier menu.

Button 191-2 is a button for selecting content with a photo category of "year", with the characters "year" being displayed at the button 191-2. If button 191-2 is selected, a content menu for selecting content with a photo category of "year" is displayed at the right side of the sommelier menu. A list of menu items for classifying content classified as photo by year taken or by year recorded is displayed at a content menu for selecting content of photo's classified by "year".

Button 191-3 is a button for selecting content with a photo category of "month", with the characters "month" being displayed at the button 191-3. If button 191-3 is selected, a content menu for selecting content with a photo category of "month" is displayed at the right side of the sommelier menu. A list of menu items for classifying content classified as photo by month taken or by month recorded is displayed at a content menu for selecting content of photo's classified by "month".

Button 191-4 is a button for selecting content with a photo category of "day", with the characters "day" being displayed at the button 191-4. If button 191-4 is selected, a content menu for selecting content with a photo category of "day" is displayed at the right side of the sommelier menu. A list of menu items for classifying content classified as photo by day taken or by day recorded is displayed at a content menu for selecting content of photo's classified by "day".

Button 191-5 is a button for selecting content with a photo category of "day of the week", with the characters "day of the week" being displayed at the button 191-5. If button 191-5 is selected, a content menu for selecting content with a photo category of "day of the week" is displayed at the right side of the sommelier menu. A list of menu items for classifying content classified as photo by day of the week taken or by day of the week recorded is displayed at a content menu for selecting content of photo's classified by "day of the week".

Button 191-6 is a button for selecting content with a photo category of "time", with the characters "time" being displayed at the button 191-6. If button 191-6 is selected, a content menu for selecting content with a photo category of "time" is displayed at the right side of the sommelier menu. A list of menu items for classifying content classified as photo by time taken or by time recorded is displayed at a content menu for selecting content of photo's classified by "time".

Button 191-7 is a button for selecting content recorded in semiconductor memory 44 installed at the drive 31, and the characters "memory stick (trademark) (E:)" are displayed at the button 191-7. If button 191-7 is selected, a content menu for selecting content recorded in the semiconductor memory 44 is displayed at the right side of the sommelier menu.

Button 191-8 is a button for selecting content recorded in semiconductor memory 44 installed at the drive 31, and the characters "memory stick (F:)" are displayed at the button 191-8. If button 191-8 is selected, a content menu for selecting content recorded in the semiconductor memory 44 is displayed at the right side of the sommelier menu.

The button 191-9 is a button for selecting a program for playing back (displaying) content of a photo collection, and the characters "photo server" are displayed on the button 191-9. If the button 191-9 is selected, a list of programs for selecting a program for displaying photo collection content is displayed at the right side of the sommelier menu.

Button 191-10 is a button for selecting content with a photo category of "event", with the characters "event" being displayed at the button 191-10. If button 191-10 is selected, a content menu for selecting content with a photo category of "event" is displayed at the right side of the sommelier menu. A list of menu items for selecting content, of content of a photo collection, taken consecutively over more than a fixed number of days, is displayed at a content menu for deleting content of the photo category of "event".

If individual discrimination is not necessary, the buttons 191-1 to 191-10 are referred to simply as "button 191".

Further, if the cursor 113 is moved upwards under a state where the cursor 113 designates the button 191-1, a sommelier menu for selecting content of a music collection is displayed. Similarly, if the cursor 113 is moved downwards under a state where the cursor 113 designates the button 191-10, a sommelier menu for selecting content of a personal video collection is displayed.

In the event that content belonging to button 191-1 to button 191-4 is deleted, button 191-1 to button 191-4 are not deleted. Further, if content belonging to button 191-5 to button 191-10 is deleted, button 191-5 to button 191-10 are deleted.

Figure 12:
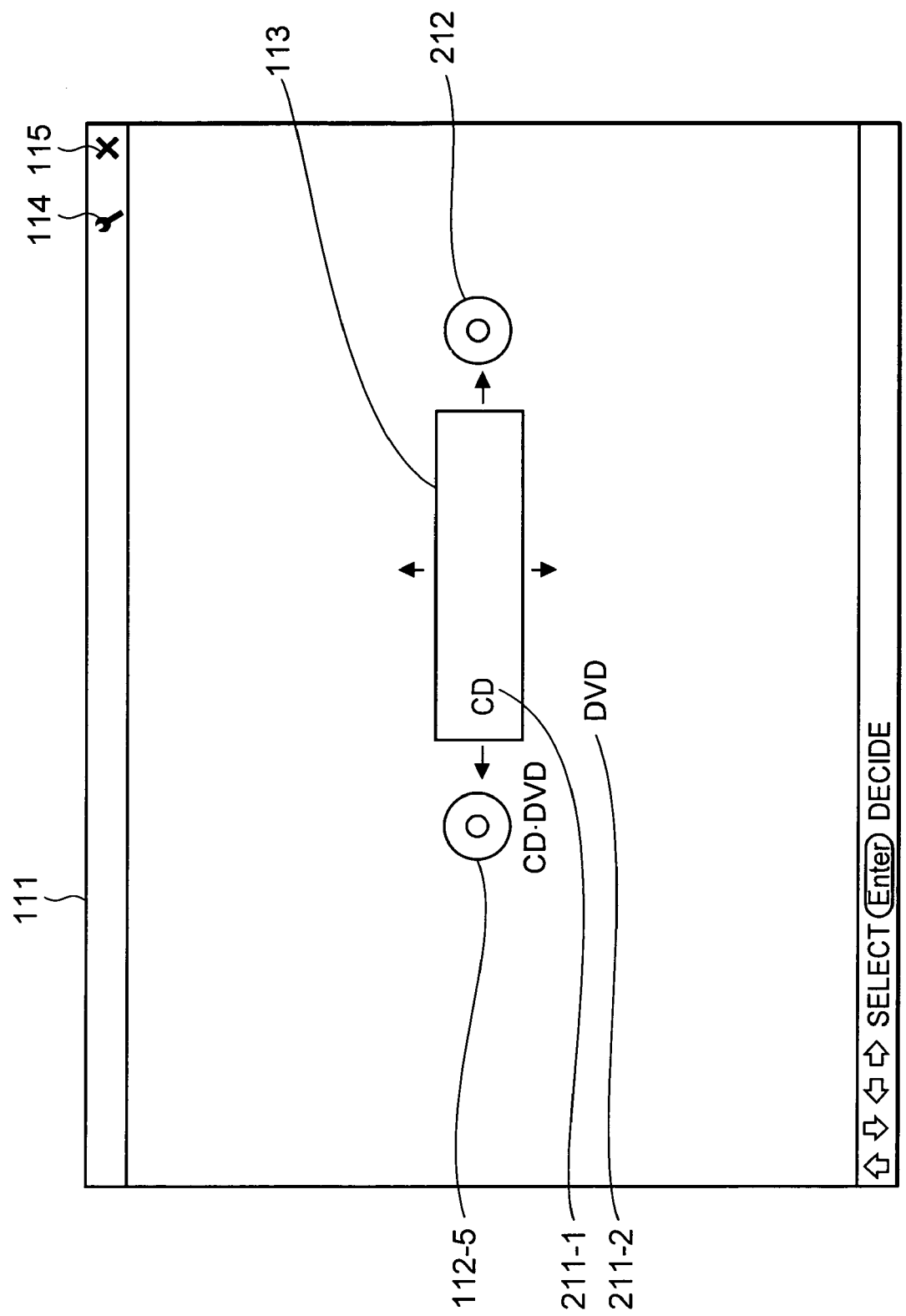
FIG. 12 is a yet another view showing an example of a sommelier menu.

Further, with the media selection menu shown in FIG. 7, if the button 112-5 is selected or the "right arrow" key of the keyboard is pressed while the button 112-5 of the menu item is being designated, a sommelier menu for selecting content of the DVD collection shown in FIG. 12 is displayed. Content of the DVD collection is classified into one or a plurality of items (hereinafter referred to as DVD category).

In the present embodiment, the display form of the media selection menu, which was previously available, changes together with a transition that makes the sommelier menu newly available. More specifically, buttons other than the button 112-5 of the menu item selected in the media menu are deleted. In the present example, the button 112-1 to button 112-4 are deleted. Further, the text information of "CD/DVD" and a corresponding icon, which are arrayed and displayed in the right/left direction in the media selection mode, are rearranged and displayed to array in the up/down direction, and display regions therefore are reduced in the right/left direction than the media selection mode.

Further, the display position of the icon/text information within the window 111 moves to left so as to utilize part of the display region used for displaying the media selection menu, thereby displaying the sommelier menu.

Button 211-1 and button 211-2 are displayed as menu items of the sommelier menu for selecting the DVD category.

Button 211-1 is a button for selecting content recorded on a CD-ROM installed at the drive 31, and the characters "CD" are displayed at the button 211-1. If button 211-1 is selected, button 212 for selecting content recorded on the CD-ROM installed at the drive 31 is displayed at the right side of the sommelier menu. An image enabling a user to relate to the CD-ROM is displayed at the button 212.

Button 211-2 is a button for selecting content recorded on a DVD installed at the drive 31, and the characters "DVD" are displayed at the button 211-2. If button 211-2 is selected, a button for selecting content recorded on the DVD installed at the drive 31 is displayed at the right side of the sommelier menu.

If individual discrimination is not necessary, the buttons 211-1 and 211-2 are referred to simply as "button 211".

Further, if the cursor 113 is moved upwards under a state where the cursor 113 designates the button 211-1, a sommelier menu for selecting content of a personal video collection is displayed. Similarly, if the cursor 113 is moved downwards under a state where the cursor 113 designates the button 211-2, a sommelier menu for selecting content of a broadcast video collection is displayed.

Moreover, if the cursor 113 is moved upwards under a state where the cursor 113 designates the button 212, a sommelier menu for selecting content of a personal video collection is displayed. Similarly, if the cursor 113 is moved downwards under a state where the cursor 113 designates the button 212, a button for selecting content recorded on a DVD is displayed.

With the multimedia playback application program according to the embodiment of the present invention, it is possible to select content from another content collection without returning to the media selection menu if content of another content collection is selected from a sommelier menu or content menu for selecting content of a content collection.

Figure 13:
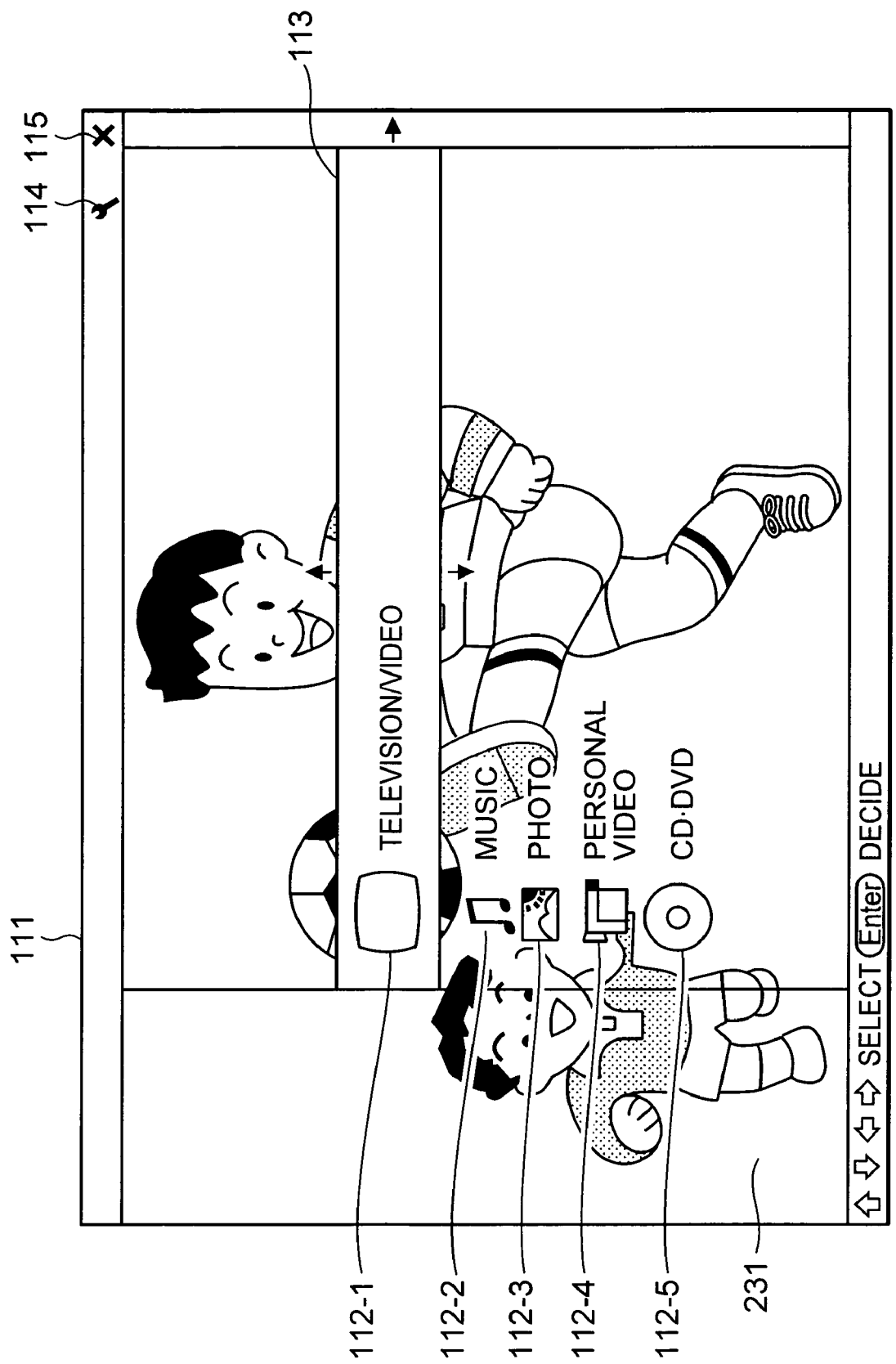
FIG. 13 is another view showing an example of a media selection menu.
Figure 14:
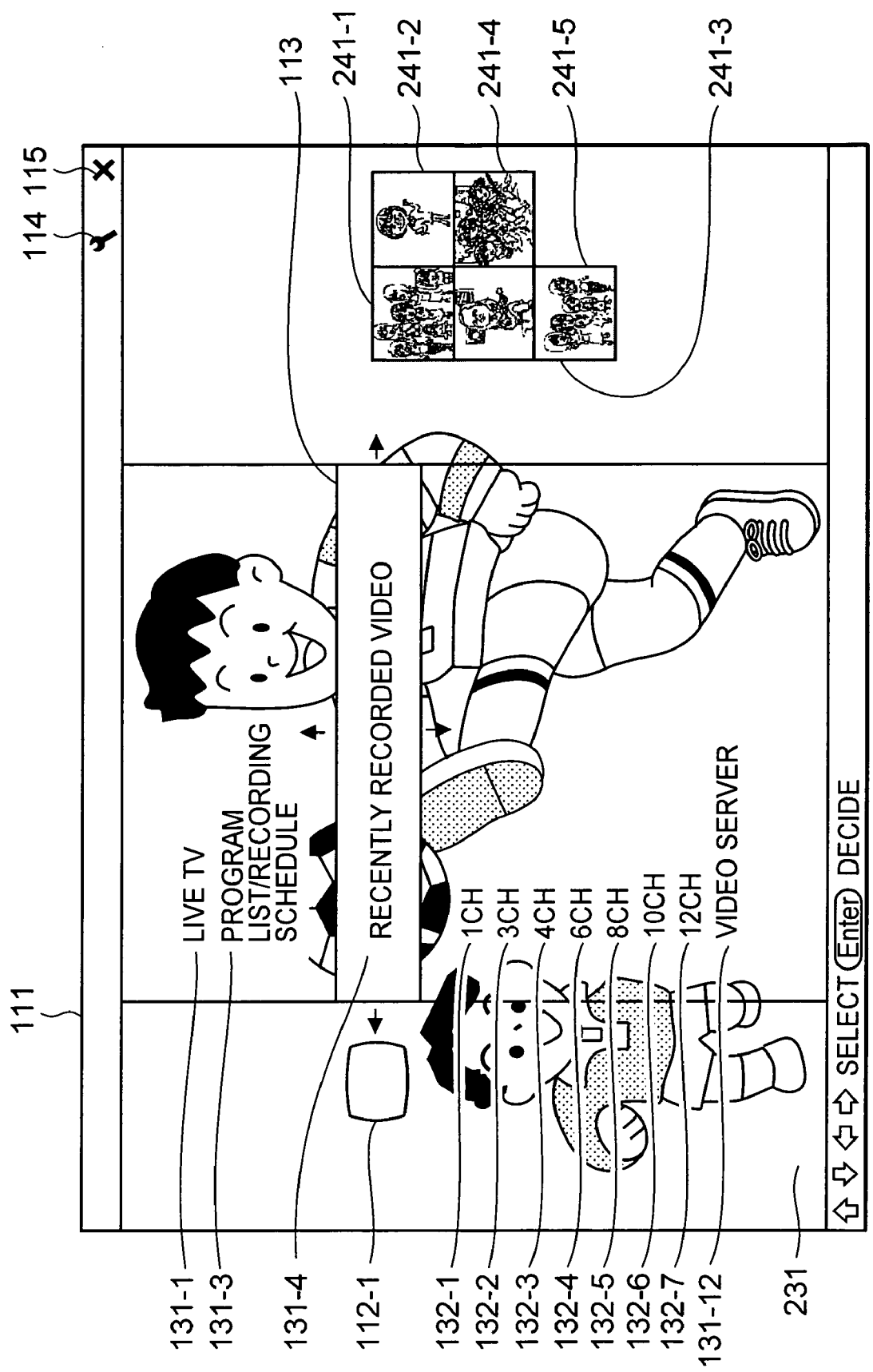
FIG. 14 is a further view showing an example of a sommelier menu.
Figure 15:
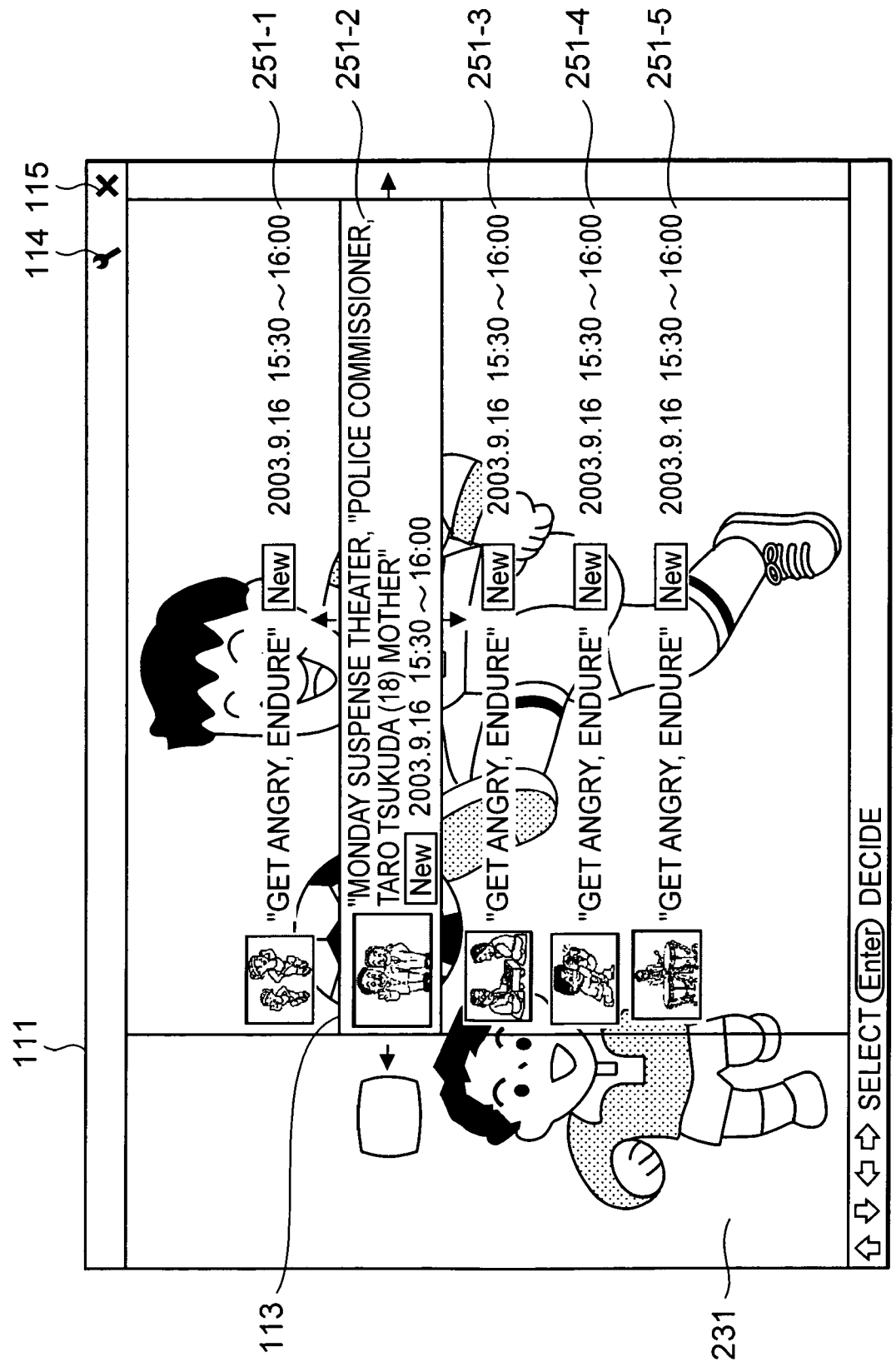
FIG. 15 is a view showing an example of a content menu.

Further, it is possible to construct images displayed at the display of the output unit 28 by the multimedia playback application program in the manner shown in FIG. 13 to FIG. 15.

As shown in FIG. 13, the media selection menu is displayed while displaying a screen for playing back content as a background screen 231 in the window 111 by an operation of the input 27 for prompting display of a menu screen during a state in which the content selected from the content menu is being played back.

In the event that one of buttons 112-1 to 112-5 is selected as a result of a user operating the input unit 27, a sommelier menu is displayed for the selected button 112. For example, if the button 112-1 is selected, a sommelier menu for selecting content of a broadcast video collection is displayed as shown in FIG. 14. In this example, the button 112-2 to button 112-5, which are the buttons other than the selected button 112-1, are deleted, and the text information of "television/video" shown in FIG. 13 is also deleted. It should be noted that the playback of content is continued during such a period of deletion.

The button 131-1, button 131-3, button 131-4, button 132-1 to button 132-7, and button 131-12 are displayed as menu items of a sommelier menu for selecting broadcast video categories.

In the example in FIG. 14, if the button 131-1 is selected, of the buttons 132 displayed at the content menu, the button 131-1 to button 132-7 are displayed as menu items of the sommelier menu. Further, if the cursor 113 is moved onto the button 131-4, images 241-1 to 241-5 representing menu items of the content menu are displayed at the right side of the sommelier menu. In the present example, in the similar way as in FIG. 10, the button 112-1, the button 131-4, the button 241-1 and the button 241-2 are displayed in the same or the substantially the same height.

In the event that the button 131-4 is selected under a state where the cursor 113 designates the button 131-4 or if the cursor is moved one to the right under a state where the cursor 113 designates the button 131-4, the content menu shown in FIG. 15 is displayed.

In FIG. 15, button 251-1 to button 251-5 for selecting content corresponding to image 241-1 to image 241-5 are displayed as menu items of the content menu. In FIG. 15, the sommelier menu is deleted, and the content menu is displayed by utilizing the entire region in which the sommelier menu was displayed in a state shown in FIG. 14. Content title and broadcast date and time is also displayed for the corresponding images 241-1 to 241-5 at button 251-1 to button 251-5. If individual discrimination is not necessary, the buttons 251-1 to 251-5 are referred to simply as "buttons 251".

Further, if one of the buttons 251-1 to 251-5 is selected (playback is designated), playing back of content corresponding to the selected button 251 is started, and playback of the played back content in the background screen 231 is stopped.

In this manner, with the multimedia playback application program, it is possible to select other content without halting the playback of content during content playback.

Figure 16:
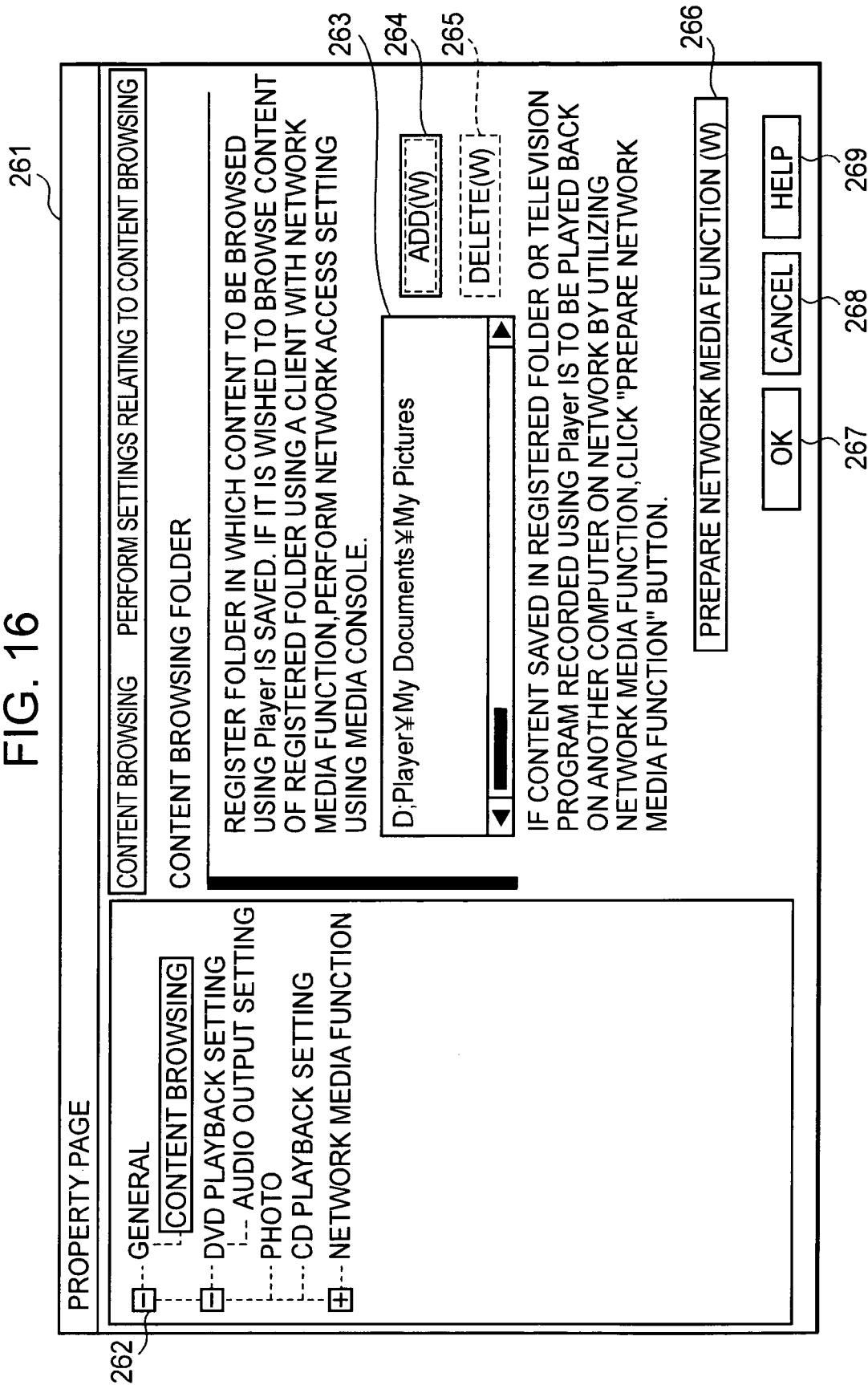
FIG. 16 is a view illustrating a folder setting dialogue.

Further, if the folder setting dialogue button 114 in the upper right of the window 111 is clicked, the output unit 28 displays a folder setting dialogue window 261 shown in FIG. 16.

The user performs various settings for the multimedia playback application program by operating the input unit 27 so as to select (click on) various buttons in the folder setting dialogue window 261.

For example, in the case of adding or deleting playback content at the multimedia playback application program, a user operates the input unit 27, clicks on the characters "watch content" of a button 262 of this hierarchical layer structure, and clicks on characters displayed in this hierarchical structure below the characters "watch content", so as to select a folder it is wished to add content to or a folder recorded with content it is wished to delete. A name containing the path of the selected folder is displayed in a selected folder display column 263.

Button 264 is clicked if a user wishes to add content recorded in the folder displayed in the selected folder display column 263, and button 265 is clicked if a user wishes to delete content recorded in the folder displayed at the selected folder display column 263. The characters "add (W)" are displayed at the button 264 and the characters "delete (W)" are displayed at the button 265.

If a user operates the input unit 27 so as to select a folder recorded with content it is wished to add or delete, clicks button 264 or button 265, then clicks button 267, at the multimedia playback application program, settings for addition or deletion of content to be played back is complete, and window 261 is closed. The characters "OK" are displayed at the button 267.

At the folder setting dialogue, in the event of playing back recorded content at another apparatus connected to the information processing apparatus via a communication network, a user operates the input unit, clicks the button 266, and carries out setting as necessary in a newly displayed window. The characters "prepare network media function (W)" are displayed at button 266.

If the button 268 is clicked, various settings carried out at the folder setting dialogue are halted and window 261 is closed. The characters "cancel" are displayed at the button 268.

Further, if button 269 is clicked, a help window (not shown) is displayed at the output unit 28. Descriptions of various settings occurring in the folder setting dialogue are displayed in the help window.

Figure 17:
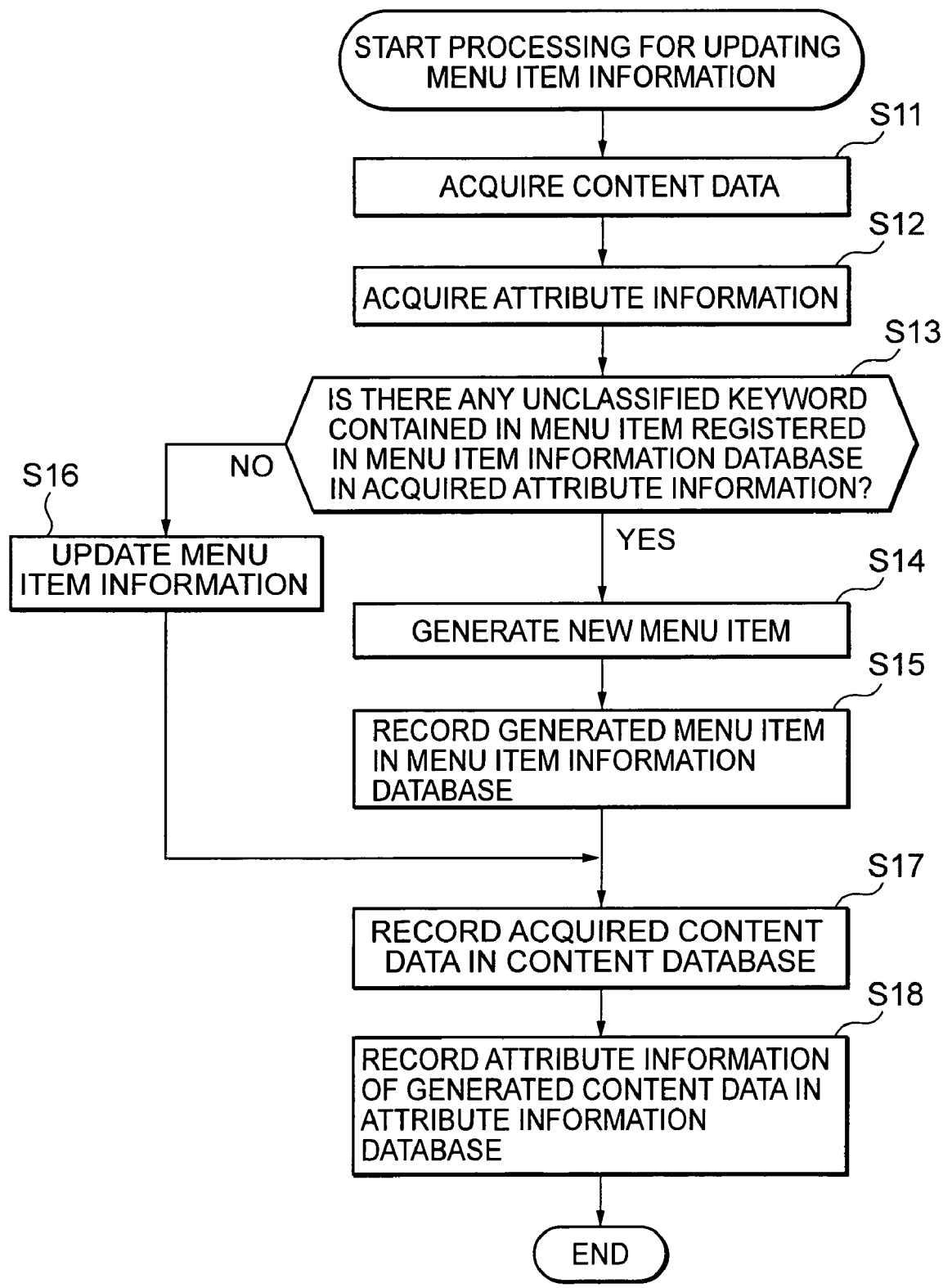
FIG. 17 is a flowchart illustrating menu item information update processing.

Next, a description is given with reference to FIG. 17 of processing for updating menu item information performed by the information processing apparatus executing the information processing program.

In step S11, the recording controller 71 acquires content data designated as a result of a user operating the input unit 27.

In step S12, the display controller 72 acquires attribute information from the recording controller 71 and acquires menu item information from the recording unit 29.

For example, in step S11, the recording controller 71-1 acquires content data designated as a result of a user operating the input unit 27 from the tuner 26, and generates attribute information based on information indicating attributes contained in the acquired content data.

More specifically, if content data is acquired from the tuner 26, the recording controller 71-1 receives EPG acquired from the tuner 26 or received by the communication unit 30, and generates attribute information based on iEPG provided by the communication unit 30.

The recording controller 71-1 may also acquire content data from other apparatuses connected to the information processing apparatus via the communication unit 30 or a USB (Universal Serial Bus) port etc.

Further, for example, the recording controller 71-2 may acquire attribute information by extracting attribute information contained in a header of the content data. For example, the recording controller 71 may acquire attribute information by extracting attribute information contained in a file corresponding to the content data.

Moreover, in step S12, the display controller 72 acquires menu item information from the menu item information database 93 of the recording unit 29.

In step S13, the attribute information retriever 94 of the display controller 72 determines whether or not there is a keyword not classified under menu items recorded in the menu item information database 93 in attribute information acquired from the recording controller 71 based on attribute information acquired from the recording controller 71 and menu item information acquired from the recording unit 29.

For example, in step S13, the attribute information retriever 94 determines whether or not a keyword not classified under a menu item is contained in the attribute information acquired from the recording controller 71 by detecting the presence of keywords classified under menu items in the respective keywords contained in the attribute information acquired from the recording controller 71.

In step S13, if it is determined that a keyword not classified under a menu item recorded in the menu item information database 93 is contained in the acquired attribute information, step S14 is proceeded to, and the menu item generator 95 of the display controller 72 generates a new menu item for the unclassified keyword the content acquired by the recording controller 71 belongs to.

In step S15, the display controller 72 controls the recording unit 29, records the generated menu item in the menu item information database 93, and updates the menu item information.

More specifically, in step S15, the display controller 72 generates information showing which content belongs to the generated menu item. The display controller 72 updates the menu item information by controlling the recording unit 29 so as to record the newly generated menu item and information indicating which content belongs to the menu item in the menu item information database 93.

On the other hand, in step S13, if it is determined that a keyword not classified under the menu items recorded in the menu item information database 93 is not contained in the acquired attribute information, it is not necessary to add a new menu item. Step S16 is therefore proceeded to, and the display controller 72 controls the recording unit 29 so that the menu item information is updated in order to correspond with content data acquired in the processing of step S11.

More specifically, the display controller 72 generates (updates) information indicating which menu items content belongs to in such a manner that content acquired by the recording controller 71 is contained in the classified menu items. The display controller 72 controls the recording unit 29 so as to record information indicating which content belongs to the generated menu item in the menu item information database 93.

In step S17, the recording controller 71 controls the recording unit 29 and records acquired content data in content database 91.

In step S18, the recording controller 71 controls the recording unit 29 and records attribute information for the generated content data in the attribute information database 92 so that menu item information updating processing is complete.

In this way, if the recording controller 71 acquires content, the information processing apparatus classifies the acquired content and updates the menu item information.

It is preferable to update the menu item information if the multimedia playback application program is started up. In this event, the display controller 72 acquires attribute information and menu item information from the recording unit 29, and the attribute information retriever 94 of the display controller 72 determines whether or not corresponding menu items have been generated for all of the content recorded in the content database 91, i.e. for all of the attribute information, based on the acquired attribute information and menu item information. In the event that it is determined that a menu item is not generated, the display controller 72 generates menu item information as with the processing of step S14.

In the event that deletion of content is designated as a result of a user operating the input unit 27, the recording controller 71 deletes the designated content and attribute information corresponding to the designated content from the recording unit 29 as a result of a user operating the input unit 27. In the event that content and attribute information is deleted, the display controller 72 carries out menu item deletion processing.

Figure 18:
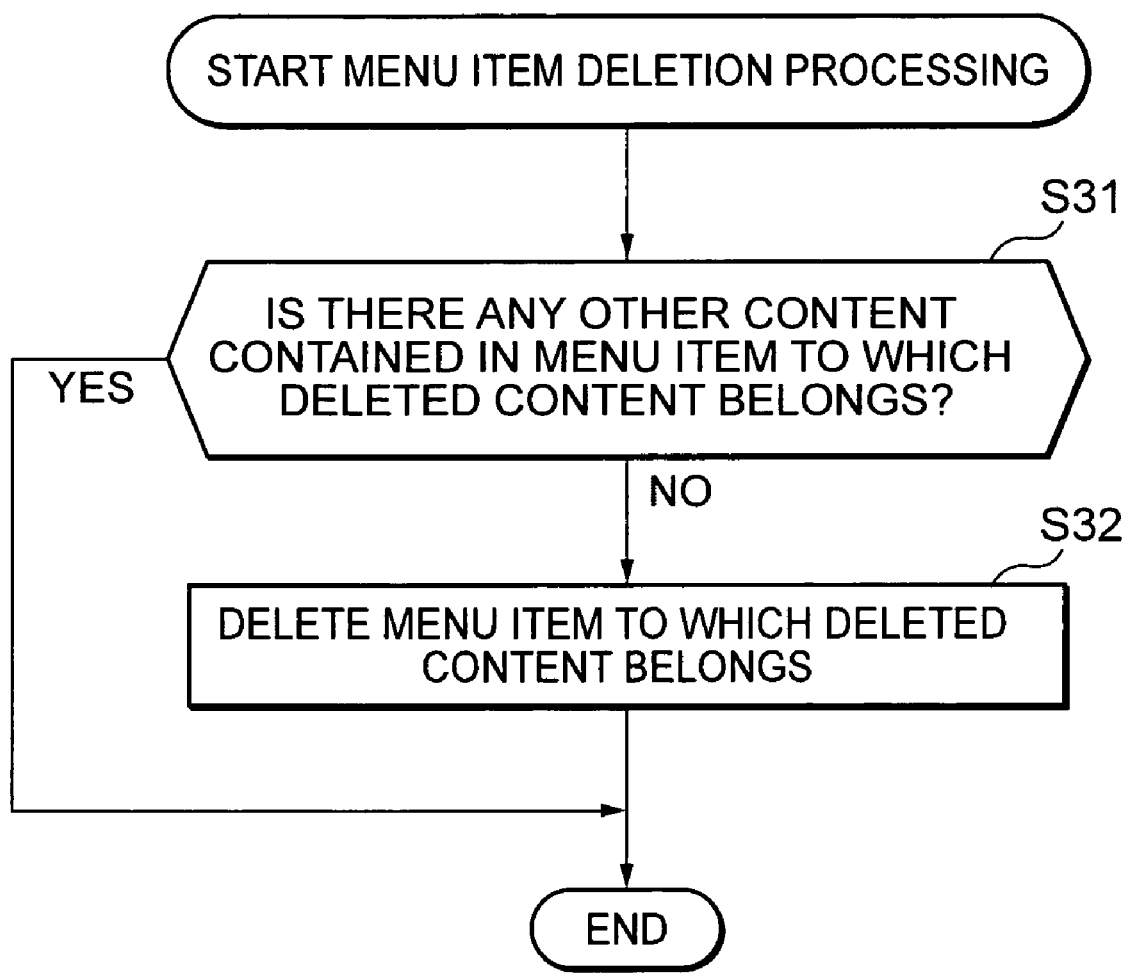
FIG. 18 is a flowchart illustrating menu item deletion processing.

With reference to the flowchart of FIG. 18, a description is given of processing for deleting menu items by the display controller 72.

In step S31, the display controller 72 refers to the menu item information database 93 to determine whether or not other content is contained in the menu item to which the deleted content belonged.

In step S31, if other content is not contained in the menu item to which the deleted content belonged, there is no content belonging to this menu item, and step S32 is proceeded to. The display controller 72 controls the recording unit 29 so that the menu item to which the deleted content belonged is deleted from the menu item information database 93, and the menu item deletion processing is complete.

More specifically, in step S32, the display controller 72 controls the recording unit 29 in such a manner that information indicating the menu item the deleted content belonged to and which content belonged to the menu item the deleted content belonged to are deleted from the menu item information database 93.

In step S31, if it is determined that other content is contained in the menu item to which the deleted content belonged, content belonging to the menu item is left as is, the processing of step S32 is skipped, and the menu item deletion processing is complete.

In the event that content is deleted, the display controller 72 controls the recording unit 29 and deletes menu items that no longer need to be displayed.

In the event that a user operates the input unit 27 so as to move the cursor 113 and select a menu item, the display controller 72 generates a menu displaying a menu item to which the selected menu item belongs.

Figure 19:
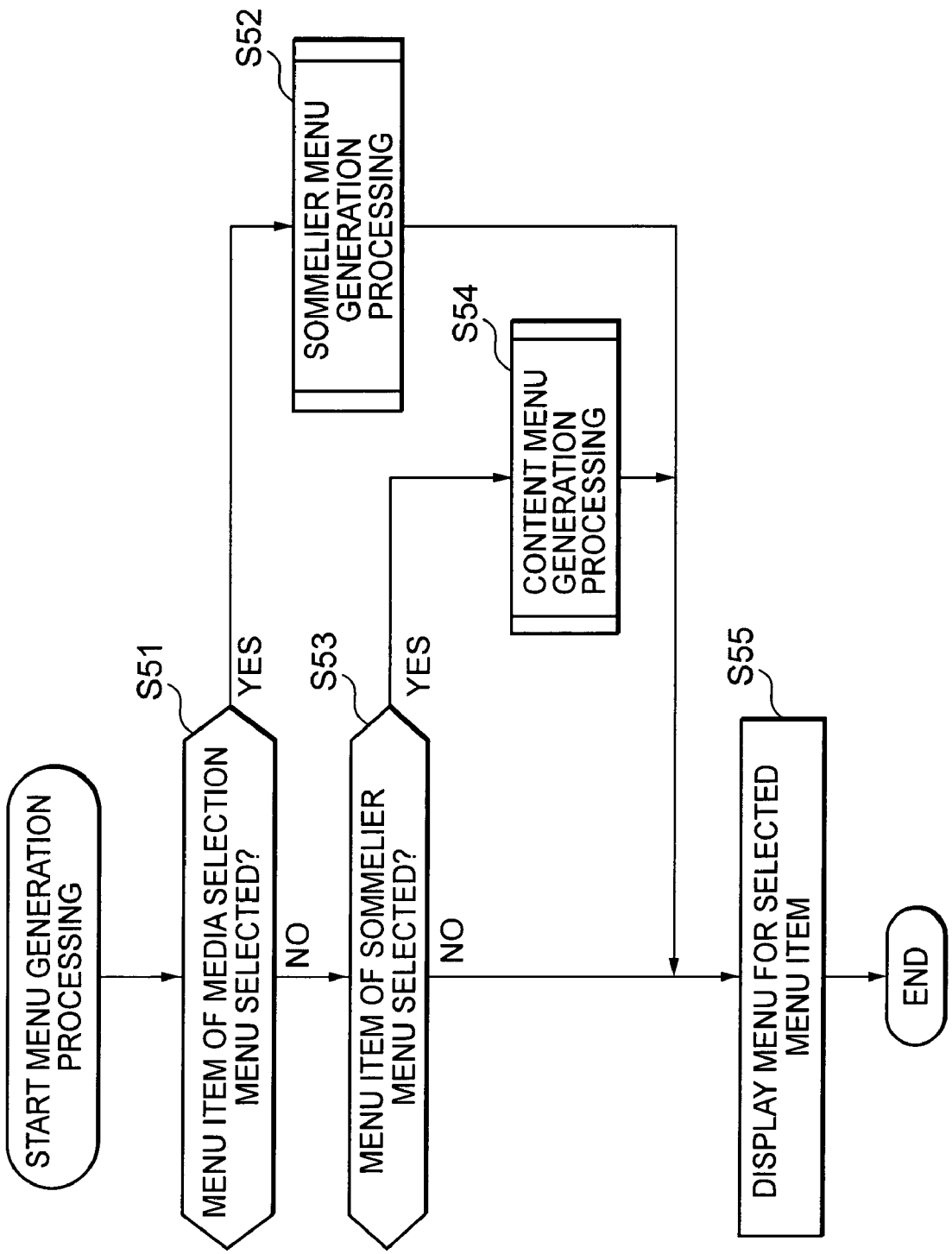
FIG. 19 is a flowchart illustrating menu generation processing.

A description is given of processing for menu generation performed by the display controller 72 with reference to the flowchart of FIG. 19.

In step S51, the display controller 72 determines whether or not a menu item of the media selection menu is selected. In the event that it is determined that a menu item of the media selection menu is selected, step S52 is proceeded to, and sommelier menu generation processing is carried out. Details of processing for generating a sommelier menu are described later but in the processing for generating the sommelier menu, a sommelier menu is generated, and the procedure proceeds to step S55.

Further, in step S51, if it is determined that a menu item of the media selection menu is not selected, step S53 is proceeded to, and the display controller 72 determines whether or not a menu item of a sommelier menu has been selected.

In step S53, if it is determined that a menu item of a sommelier menu is selected, step S54 is proceeded to, and the display controller 72 carries out content menu generation processing. Details of processing for generating a content menu are described later but in the processing for generating the content menu, a content menu is generated, and the procedure proceeds to step S55.

In step S53, if it is determined that a menu item of a sommelier menu is not selected, step S55 is proceeded to.

In step S55, the display controller 72 supplies a menu for the selected menu item to the output unit 28, and the output unit 28 displays the menu supplied by the display controller 72 on a display of the output unit 28.

If a menu item is selected, the display controller 72 generates a menu for the selected menu item, provides data for displaying the generated menu to the output unit 28, and displays the menu provided by the display controller 72 on the display of the output unit 28.

Figure 20:
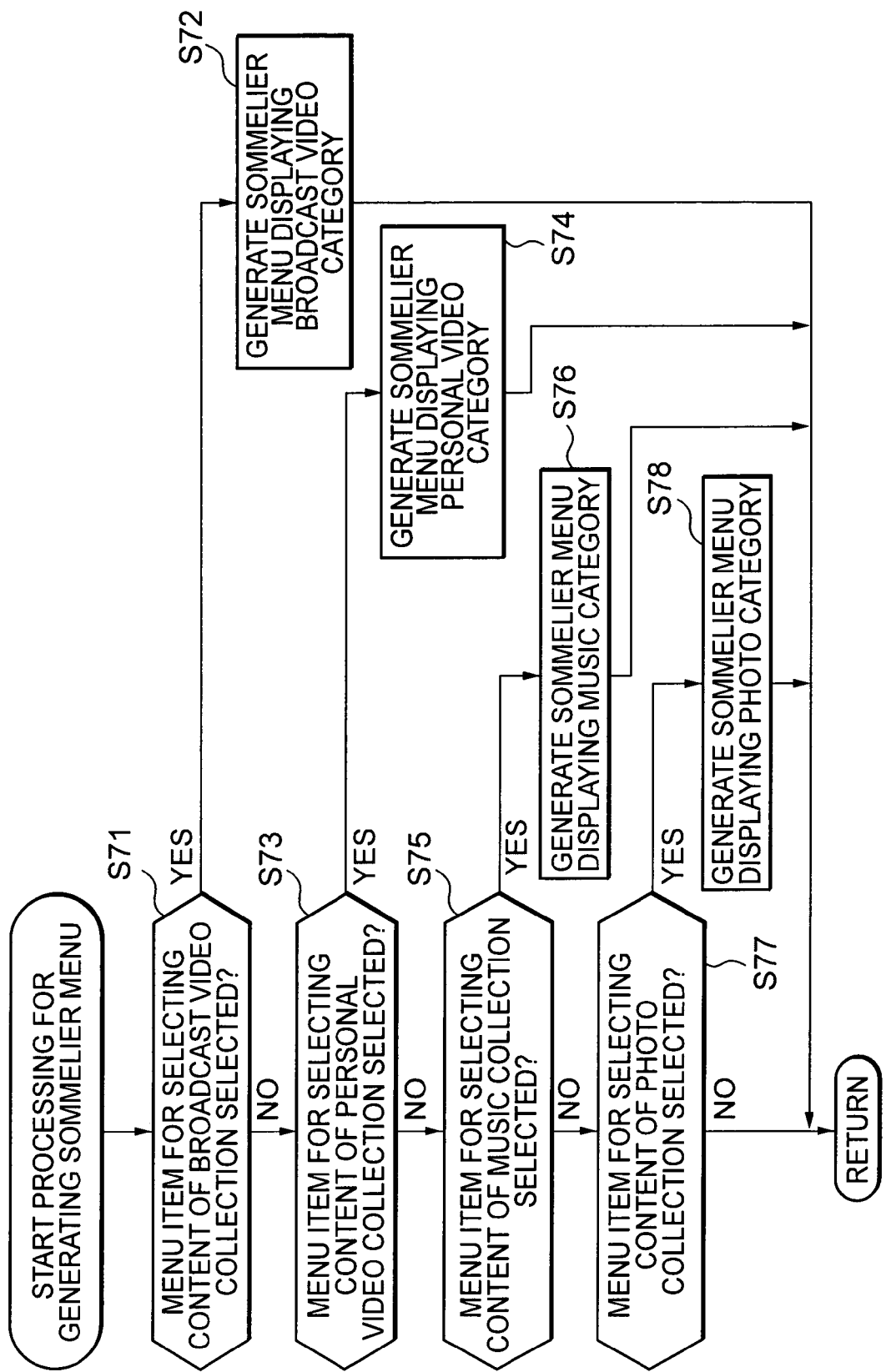
FIG. 20 is a flowchart illustrating sommelier menu generation processing.

Next, a description is given with reference to the flowchart of FIG. 20 of processing for generating a sommelier menu corresponding to the processing of step S52 of FIG. 19.

In step S71, the display controller 72 determines whether or not a menu item for selecting content of the broadcast video collection is selected at the media selection menu. In the event that it is determined that a menu item for selecting content of the broadcast video collection is selected, step S72 is proceeded to, the display controller 72 refers to menu item information recorded in the menu item information database 93 so as to generate a sommelier menu for displaying broadcast video categories, and the processing is complete.

In step S71, if it is determined that a menu item for selecting content of the broadcast video collection is not selected at the media selection menu, step S73 is proceeded to, and the display controller 72 determines whether or not a menu item for selecting content of the personal video collection is selected at the media selection menu.

In step S73, if it is determined that a menu item for selecting content of the personal video collection is selected, step S74 is proceeded to, the display controller 72 generates a sommelier menu for displaying personal video categories while referring to menu item information recorded in the menu item information database 93, and processing is complete.

Further, in step S73, if it is determined that a menu item for selecting content of the personal video collection is not selected, step S75 is proceeded to, and the display controller 72 determines whether or not a menu item for selecting content of the music collection is selected at the media selection menu.

In step S75, if it is determined that a menu item for selecting content of the music collection is selected, step S76 is proceeded to, the display controller 72 generates a sommelier menu for displaying music categories while referring to menu item information recorded in the menu item information database 93, and processing is complete.

In step S75, if it is determined that a menu item for selecting content of the music collection is not selected, step S77 is proceeded to, and the display controller 72 determines whether or not a menu item for selecting content of the photo collection is selected at the media selection menu.

In step S77, if it is determined that a menu item for selecting content of the photo collection is selected, step S78 is proceeded to, the display controller 72 generates a sommelier menu for displaying photo categories while referring to menu item information recorded in the menu item information database 93, and processing is complete.

Moreover, if it is determined in step S77 that a menu item for selecting content of the photo collection is not selected, the display controller 72 does not generate a sommelier menu and the processing is complete.

In this manner, the display controller 72 generates a sommelier menu.

A description is now given with reference to the flowchart of FIG. 21 of processing for generating a content menu corresponding to the processing of step S54 of FIG. 19.

In step S91, the display controller 72 determines whether or not a menu item for selecting a broadcast video category is selected at the sommelier menu. In the event that it is determined that a menu item for selecting a broadcast video category is selected, step S92 is proceeded to. The display controller 72 generates a content menu displaying content of the broadcast video category with reference to menu item information recorded in the menu item information database 93 and attribute information recorded in the attribute information database 92, and processing is complete.

In the event that it is determined in step S91 that a menu item for selecting a broadcast video category is not selected at the sommelier menu, step S93 is proceeded to. The display controller 72 determines whether or not a menu item for selecting the personal video category is selected at the sommelier menu.

In step S93, if it is determined that a menu item for selecting content of the personal video category is selected, step S94 is proceeded to, the display controller 72 generates a content menu for displaying content of the personal video category while referring to menu item information recorded in the menu item information database 93 and attribute information recorded in the attribute information database 92, and processing is complete.

In the event that it is determined in step S93 that a menu item for selecting the personal video category is not selected, step S95 is proceeded to. The display controller 72 determines whether or not a menu item for selecting the music category is selected at the sommelier menu.

In step S95, if it is determined that a menu item for selecting content of the music category is selected, step S96 is proceeded to, the display controller 72 generates a content menu for displaying content of the music category while referring to menu item information recorded in the menu item information database 93 and attribute information recorded in the attribute information database 92, and processing is complete.

In the event that it is determined in step S95 that a menu item for selecting the music category is not selected, step S97 is proceeded to. The display controller 72 determines whether or not a menu item for selecting the photo category is selected at the sommelier menu.

In step S97, if it is determined that a menu item for selecting content of the music category is selected, step S98 is proceeded to, the display controller 72 generates a content menu for displaying content of the photo category while referring to menu item information recorded in the menu item information database 93 and attribute information recorded in the attribute information database 92, and processing is complete.

Moreover, if it is determined in step S97 that a menu item for selecting the photo category is not selected, the display controller 72 does not generate a content menu and the processing is complete.

In this manner, the display controller 72 generates a content menu.

Further, if a menu item for selecting content of a content collection different to content being played back during playback of content, the display controller 72 carries out processing to halt playback of content.

A description is now given with reference to the flowchart of FIG. 22 of processing for stopping playback of content performed by the display controller 72.

In step S111, the display controller 72 determines whether or not a menu item for selecting content of a different content collection to the content being played back is selected. In the event that it is determined that a menu item for selecting content different to the content collection of the content being played back is not selected, step S111 is returned to. This determination process is repeated until there is a determination that a menu item for selecting content of a content collection different to the content being played back is selected.

On the other hand, if it is determined in step S111 that a menu item for selecting content of a content collection different to that of the content being played back is selected, step S112 is proceeded to. The display controller 72 determines whether or not the selected menu item is a menu item for selecting content of the DVD collection.

In the event that it is determined in step S112 that the selected menu item is not a menu item for selecting content of the DVD collection, step S113 is proceeded to. The display controller 72 determines whether or not playback of the newly selected content has started.

For example, in step S113, the display controller 72 determines whether or not playback of newly selected content has started based on a signal indicating playback of content supplied by the playback controller 73.

In step S113, if it is determined that playback of the newly selected content has not started, the display controller 72 returns to step S113, and the determination processing is repeated until it is determined that playback of the newly selected content has started.

On the other hand, if it is determined in step S113 that playback of the newly selected content has commenced, the display controller 72 proceeds to step S114, and displaying of the image displayed at the output unit 28 is switched over from the image displayed for content being played back to an image displaying the newly selected content for which playback has started.

For example, in step S114, the display controller 72 changes over displaying of the image displayed at the output unit 28 by switching over the image signal supplied to the output unit 28 from the image signal for the content being played back to the image signal for the newly selected content for which playback has started.

In step S115, the display controller 72 controls the playback controller 73, stops playback of content that was played back up to this time, and processing for stopping playback of the content is complete.

Further, if it is determined in step S112 that the selected menu item is a menu item for selecting content of the DVD collection, step S116 is proceeded to. The display controller 72 controls the playback controller 73-3 so as to halt playback of the content of the DVD collection.

In step S117, the display controller 72 supplies prescribed still images to the output unit 28 as display images for the application program that played back the DVD collection content. The output unit 28 displays the still images supplied by the display controller 72 at the display of the output unit 28, and if playback of new content has started, images for the played back content are displayed, and processing is complete.

In this way, if playback of content for a content collection different to the content being played back starts while the content is being played back, the display controller 72 is capable of halting playback of content without playback of the content being interrupted.

The information processing apparatus therefore enables addition and deletion of menu items for display content classified in individual categories in accompaniment with the addition and deletion of content without a user operation being required. Further, the embodiment of the present invention also enables selection of content classified in other categories without playback of content being interrupted.

A description is given of where a user operates a mouse and keyboard constituting an input unit 27 in order to carry out various designations and settings but a remote controller may also be used as an input unit 27.

According to the embodiment of the present invention, playback of content is possible because content to be played back may be designated at the multimedia playback application program. Further, according to the present invention, addition and deletion of menu items takes place based on attribute information and menu item information. Menu items for displaying content classified into categories may therefore be added or deleted without user operation being required.

Moreover, according to the embodiment of the present invention, menu item information is recorded in the same hierarchical layer. It is therefore possible to select content classified in another category without interrupting playback of content.

The series of processes described above are executed using hardware, but may also be executed using software. If the series of processes is implemented using software, the programs included in this software may be built-into dedicated hardware of a computer. Further, as it is possible to implement various functions by installing the various programs, installation is also possible from a recording medium to, for example, a general-purpose personal computer.

As shown in FIG. 5, in addition to packaged media that are separate from a personal computer such as the magnetic disc 41 (including flexible discs), the optical disc 42 (including CD-ROMs and DVDs), magneto-optical discs 43 (including MDs (Mini-Discs)(recorded Trademark)), or semiconductor memory 44 etc. recorded with programs for distribution to provide programs to users, the recording medium may also be provided to the user through pre-installation on a computer or in the form of a hard disc etc. containing a ROM 22 or recording unit 29 recorded with the program.

A program for executing the series of processes described above may also be installed on a computer via an interface such as a router or modem etc., or via a wired or wireless communication medium such as a local area network, the Internet, or digital satellite broadcasting etc., as necessary.

Further, in this specification, the steps described by programs stored in recording media are for processing carried out in chronological order in the order disclosed but this processing by no means has to be carried out in chronological order, and these processes may also be executed in parallel or individually.

It should be understood by those skilled in the art that various modifications, combinations, sub-combinations and alternations may occur depending on design requirements and other factors insofar as they are within the scope of the appended claims or equivalents thereof.

What is claimed is:

1. An information processing apparatus for providing menu information, said apparatus comprising:
  a processor;
  menu generation means for generating a plurality of menus in correspondence to a plurality of categories, the plurality of menus operative to search the plurality of categories including at least one of image content, video content and audio content, each menu having at least one menu item and at least one menu having at least one menu item arranged along a first direction when displayed on a display screen, the image content, video content and audio content being selectable for search from a menu corresponding to another of the categories;
  display control means for controlling display of the plurality of menus generated by the menu generation means according to a plurality of menu levels; and
  menu level shifting means for shifting a menu level in response to a first input signal that corresponds to a movement in a second direction, the movement the second direction crossing the first direction,
  wherein, in response to the shifting of the menu level, the display control means reduces a size of a display region in the second direction, and displays a respective menu of another menu level utilizing at least part of the display region of a previously displayed menu corresponding to a respective menu level displayed before menu level shifting, and
  the movement corresponding to the first input signal is possible in two directions parallel to the second direction, and the display control means, in response to the shifting of the menu level, displays a new menu of a respective menu level which is adjacent to the menu level that was previously displayed, said new menu being displayed at one side of the display screen, the side being in one of the two directions parallel to the second direction.

2. The information processing apparatus according to claim 1, wherein in response to the shifting of the menu level, the display control means deletes at least one of the menu items other than a currently selected menu item from among the menu items of the menu level that was previously displayed.

3. The information processing apparatus according to claim 1, wherein the display control means switches display of menu items belonging to the respective menu level adjacent to the menu level that is currently being displayed in response to a second input signal that corresponds to a movement in the first direction.

4. The information processing apparatus according to claim 3, wherein the first input signal enables movement in the second direction from a respective menu item positioned in a predetermined location on the display screen, said respective menu item being reachable by a movement in the first direction indicated by the second input signal, and the display control means displays a first menu item positioned in the predetermined location in substantially the same position in the first direction as a second menu item belonging to the menu level adjacent to the menu level that is currently being displayed.

5. An information processing apparatus for providing menu information, said apparatus comprising:
  a processor;
  a menu generator configured to generate a plurality of menus in correspondence to a plurality of categories, each menu having at least one menu item and at least one menu having at least one menu item arranged along a first direction when displayed on a display screen, and each menu item corresponding to one of the categories being selectable for search from a menu corresponding to another of the categories;

a display controller configured to control display of the plurality of menus generated by the menu generator in accordance with a plurality of menu levels; and a menu level shifting device configured to shift a menu level in response to a first input signal that corresponds to a movement in a second direction, said menu level including at least two guides configured to lead to a same content, and wherein in said movement the second direction crosses the first direction; and wherein, in response to the shifting of the menu level, the display controller reduces a size of a display region in the second direction, and displays a respective menu of another menu level utilizing at least part of the display region of a previously displayed menu of a respective menu level displayed before the menu level shifting occurred, and the movement corresponding to the first input signal is possible in two directions parallel to the second direction, and the display controller, in response to the shifting of the menu level, displays a new menu of a respective menu level which is adjacent to the menu level that was previously displayed, said new menu being displayed at one side of the display screen, the side being in one of the two directions parallel to the second direction.

6. A method for providing menu information, said method comprising the steps of:

generating a plurality of menus in correspondence to a plurality of categories, the plurality of menus operative to search the plurality of categories including at least one of image content, video content and audio content, each menu having at least one menu item, at least one menu having at least one menu item arranged along a first direction when displayed on a display screen, the image content, video content and audio content being selectable for search from a menu corresponding from another of the categories;

controlling display, by a processor, of the plurality of generated menus in accordance with a plurality of menu levels; and shifting a menu level in response to a first input signal that corresponds to a movement in a second direction, the second direction crossing the first direction, wherein, in response to the shifting of the menu level, a size of a display region is reduced in the second direction, and a respective menu of another menu level is displayed utilizing at least part of the display region of a previously displayed menu of a respective menu level displayed before the menu level shifting occurred, and the movement corresponding to the first input signal is possible in two directions parallel to the second direction, and, in response to the shifting of the menu level, a new menu of a respective menu level, which is adjacent to the menu level that was previously displayed, is displayed, said new menu being displayed at one side of the display screen, the side being in one of the two directions parallel to the second direction.

7. A computer readable medium having computer readable instructions stored thereon, the computer readable instructions when executed by a computer cause the computer to perform a method comprising:

generating a plurality of menus in correspondence to a plurality of categories, the plurality of menus operative to search the plurality of categories including at least one of image content, video content and audio content, each menu having at least one menu item, at least one menu having at least one menu item arranged along a first direction when displayed on a display screen, the image content, video content and audio content being selectable for search from a menu corresponding to another of the categories;

controlling display of the plurality of generated menus in accordance with a plurality of menu levels; and shifting a menu level in response to a first input signal that corresponds to a movement in a second direction, wherein in said movement the second direction crosses the first direction, wherein, in response to the shifting of the menu level, a size of a display region is reduced in the second direction, and a respective menu of another menu level is displayed by utilizing at least part of the display region of the previously displayed menu of the respective menu level displayed before the menu level shifting occurred, and the movement corresponding to the first input signal is possible in two directions parallel to the second direction, and, in response to the shifting of the menu level, a new menu of a respective menu level, which is adjacent to the menu level that was previously displayed, is displayed, said new menu being displayed at one side of the display screen, the side being in one of the two directions parallel to the second direction.

* * * * *